(12) United States Patent
Morita et al.

(10) Patent No.: US 7,244,293 B2
(45) Date of Patent: Jul. 17, 2007

(54) RESERVOIR TANK

(75) Inventors: Michiko Morita, Yokohama (JP);
Hitoshi Shimonosono, Yokohama (JP);
Shizuo Yamamoto, Yokosuka (JP);
Katsuyuki Fujii, Yokosuka (JP);
Tomoyuki Hanada, Yamato (JP);
Toshihiro Yamashita, Chigasaki (JP);
Kenichiro Minami, Sagamihara (JP)

(73) Assignee: Nissan Motor Co., Ltd., Yokhama-shi (JP)

( * ) Notice: Subject to any disclaimer, the term of this patent is extended or adjusted under 35 U.S.C. 154(b) by 317 days.

(21) Appl. No.: 10/967,141

(22) Filed: Oct. 19, 2004

(65) Prior Publication Data

US 2005/0081716 A1  Apr. 21, 2005

(30) Foreign Application Priority Data

Oct. 20, 2003  (JP)  ............................. 2003-358653
Aug. 31, 2004  (JP)  ............................. 2004-253285

(51) Int. Cl.
*B01D 19/00*  (2006.01)

(52) U.S. Cl. ............................ 96/204; 96/206; 96/219; 96/220; 220/562; 210/172.2; 210/461; 95/259

(58) Field of Classification Search .................. 96/155, 96/204, 206, 219, 220; 95/259, 260, 262; 210/172, 461; 220/86.1, 86.2, 562, 563, 220/601, 661
See application file for complete search history.

(56) References Cited

U.S. PATENT DOCUMENTS

| 6,053,967 A | * | 4/2000 | Heilmann et al. | ............. 96/208 |
| 6,709,488 B2 | * | 3/2004 | Lunden et al. | ................ 95/262 |
| 2002/0117053 A1 | * | 8/2002 | Lunden et al. | ................ 95/262 |

FOREIGN PATENT DOCUMENTS

JP  2003-126631 A  5/2003

* cited by examiner

*Primary Examiner*—Duane Smith
*Assistant Examiner*—Douglas J. Theisen
(74) *Attorney, Agent, or Firm*—Foley & Lardner LLP

(57) ABSTRACT

A reservoir tank which includes: a container for storing fluid therein, having an inlet through which the fluid flows into the container and an outlet through which the fluid flows out of the container; and a duct provided inside the container, which is connected to the inlet of the container and has a first opening open inside the container. The first opening is located above the outlet of the container and below a surface of the fluid in the container.

21 Claims, 20 Drawing Sheets

RESERVOIR TANK

BACKGROUND OF THE INVENTION

1. Field of the Invention

The present invention relates to a reservoir tank having a function to separate gas and liquid.

2. Description of Related Art

Japanese Patent Laid-Open Publication No. 2003-126631 discloses a reservoir tank which consists of a lower container for storing fluid and an upper container provided on top of the lower container, communicating with the lower container. The lower container has an outlet, and the upper container has an opening on an upper wall thereof and an inlet on a sidewall thereof.

A fluid flows through the inlet into the upper container in a form of a gas-liquid flow. As the liquid flows downward in the upper container, the gas mixed in the liquid is separated from the liquid as bubbles rising in the liquid, and is discharged from the opening of the upper container.

SUMMARY OF THE INVENTION

However, in the reservoir tank described above, the inlet of the upper container is located above the level of the liquid stored in the lower container. The fluid flowing into the upper container plunges into the liquid in the lower container. The plunging stream of the fluid catches the gas in the upper container into the liquid in the lower container. Thereafter, the gas mixed in the liquid flows out of the outlet of the lower container. When a flow rate of the fluid is increased, the inertial force of the fluid flowing in the upper container gets over the buoyancy of the gas bubbles, and the gas bubbles cannot escape from the stream of the fluid and flows into the outlet together with the liquid. Thus, performance in the gas-liquid separation is impaired to a great extent.

The present invention is made in the light of this problem. An object of the present invention is to provide a reservoir tank having an enhanced performance in the gas-liquid separation.

An aspect of the present invention is a reservoir tank comprising: a container for storing fluid therein, the container having an inlet through which the fluid flows into the container and an outlet through which the fluid flows out of the container; and a duct provided inside the container, the duct being connected to the inlet of the container and having a first opening open inside the container, wherein the first opening of the duct is located above the outlet of the container and below a surface of the fluid in the container.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
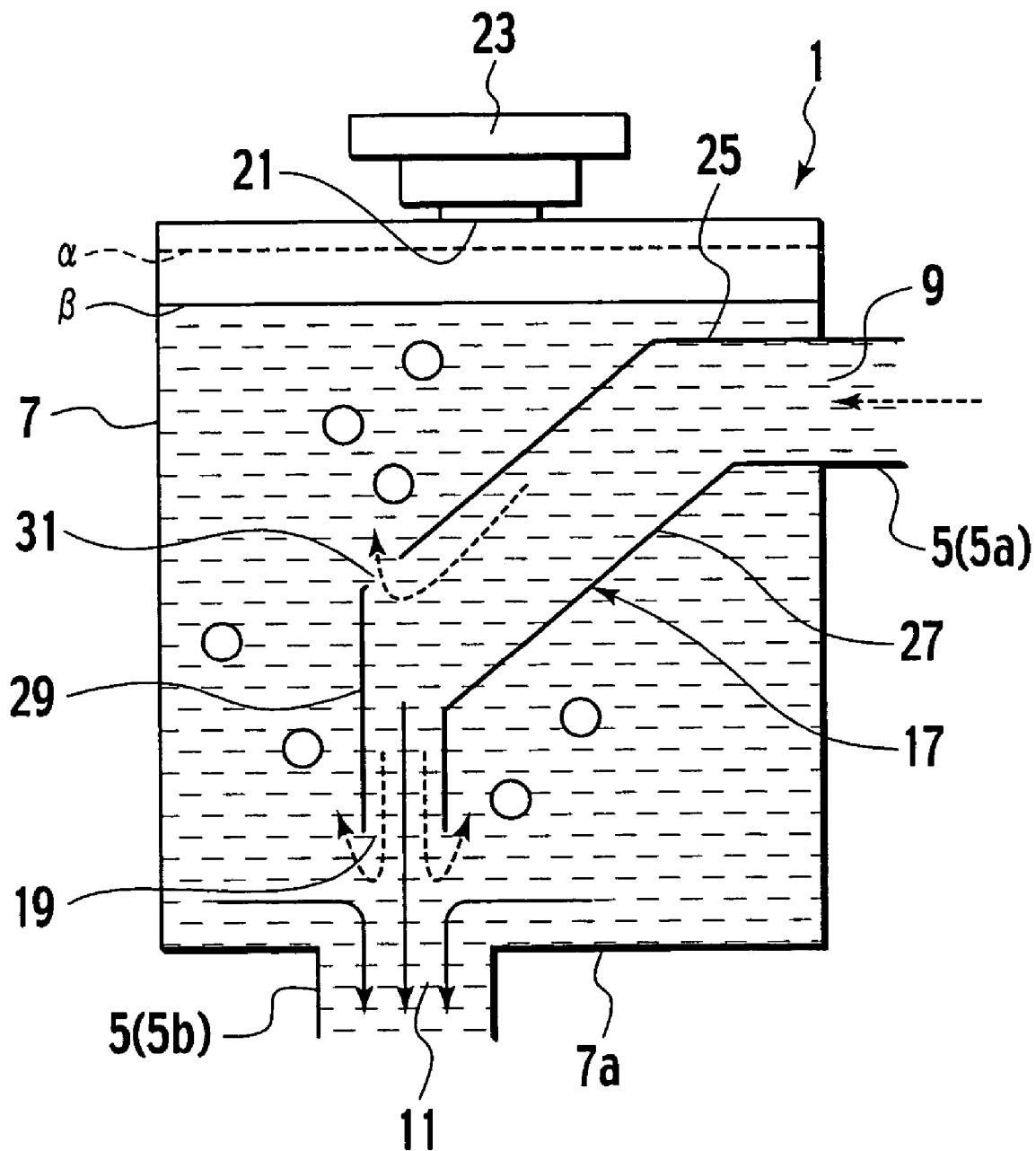
FIG. 1 is a cross-sectional view of a reservoir tank according to a first embodiment of the present invention.

Embodiments of the present invention will be explained below with reference to the drawings, wherein like members are designated by like reference characters.

Figure 2:
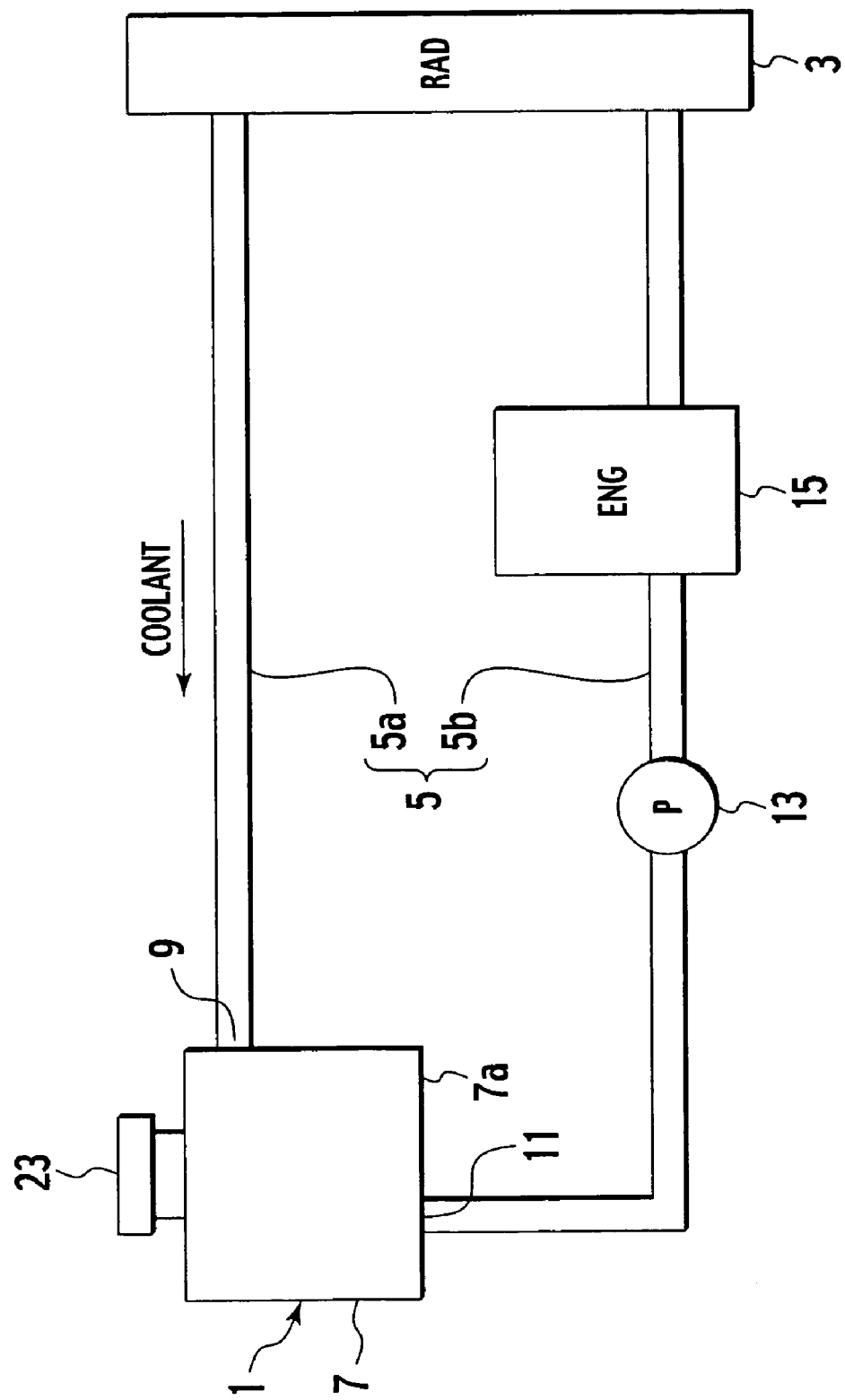
FIG. 2 is a view showing an entire fluid circulation system utilizing the reservoir tank of FIG. 1.

As shown in FIGS. 1 and 2, a reservoir tank 1 according to a first embodiment of the present invention is applied to a fluid circulation system mounted, for example, on an automobile. The reservoir tank 1 stores a coolant circulating in the system. A radiator 3 for cooling the coolant is connected to the reservoir tank 1 though a circulation flow path 5.

The reservoir tank 1 has a container 7 for storing the coolant therein. An inlet 9 through which the coolant is introduced into the container 7 is provided on an upper wall of the container 7. The inlet 9 and the radiator 3 are connected to each other by a first flow path 5a of the circulation flow path 5. On a bottom 7a of the container 7, an outlet 11 from which the coolant in the container 7 flows to the outside is provided. The outlet 11 and the radiator 3 are connected to each other by a second flow path 5b of the circulation flow path 5. On the second flow path 5b, a pump 13 and an engine 15 are provided in this order from the reservoir tank 1.

The coolant discharged from the pump 13 is sent through the second flow path 5b to the engine 15 generating heat. The coolant is heated when cooling the engine 15, and is cooled at the radiator 3. The coolant flows from the radiator 3 through the first flow path 5a into the reservoir tank 1. The coolant in the reservoir tank 1 flows out of the outlet 11 through the second flow path 5b, and returns to the pump 13 again.

As shown in FIG. 1, an internal duct 17 is provided in the reservoir tank 1. One end of the internal duct 17 is connected to the inlet 9. On the other end of the internal duct 17, an end opening 19 is provided. The end opening 19 is located directly above the outlet 11 and open downward inside the container 7. On a top wall of the reservoir tank 1, a filler port 21 is provided. A detachable cap 23 is provided to close the filler port 21.

Figure 3:
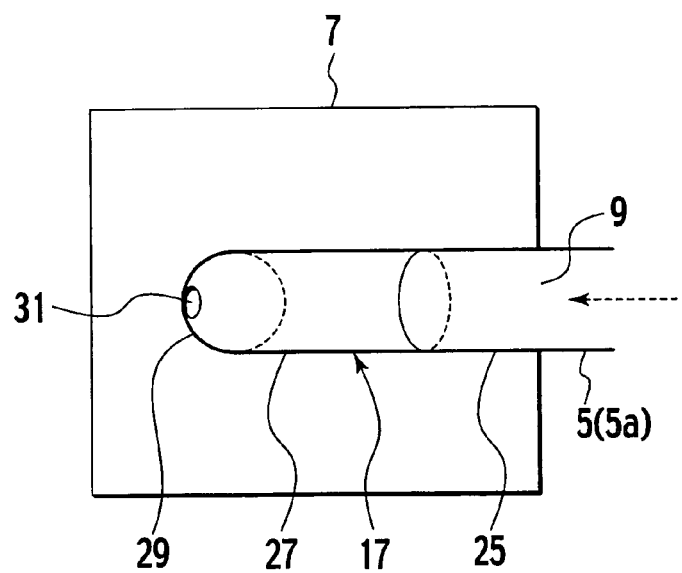
FIG. 3 is a plan view of the reservoir tank of FIG. 1, showing a positional relationship between a container and an internal duct.

As shown in FIG. 3, the internal duct 17 has a horizontal portion 25 extended from the inlet 9 in the horizontal direction, an inclined portion 27 extended from a downstream end of the horizontal portion 25 toward the lower left in FIG. 1, and a vertical portion 29 extended from a downstream end of the inclined portion 27 toward the outlet 11.

Specifically, the internal duct 17 has, between the inlet 9 and the end opening 19, the inclined portion 27 extended in a direction inclined with respect to the vertical direction. The vertical portion 29 constitutes an extended portion which is extended from an end of the inclined portion 27 on the side of the outlet 11 in a direction different from an extended direction of the inclined portion 27, thus forming a bent duct.

The vertical portion 29 is formed such that an inner diameter thereof is made smaller than an inner diameter of the outlet 11. Centerlines of the vertical portion 29 and outlet 11 are aligned with each other.

Moreover, in a region where the inclined portion 27 and the vertical portion 29 are connected to each other, on an upper side face thereof, or a side face facing to a direction opposite to the direction of gravitational force, an air bleeder port 31 is provided, allowing a space inside the internal duct 17 and a space inside the container 7, which is outside of the internal duct 17, to communicate with each other.

Note that a liquid level of the coolant in the container 7 varies depending on operation status of the pump 13. A normal liquid level is a liquid level when the coolant in an amount required for an operation of the system rests in the container 7. When the pump 13 is operated, the liquid level becomes lower than the normal liquid level. The lowermost level of the varying liquid level is a pump-operated liquid level $\beta$. A liquid level $\alpha$ in FIG. 1 is a liquid level when the reservoir tank 1 is filled up.

The end opening 19 is located above the outlet 11 in the vertical direction and below the pump-operated liquid level $\beta$ which is the lowermost liquid level of the coolant in the container 7.

The air bleeder port 31 is also located below the pump-operated liquid level $\beta$.

Next, an operation of the first embodiment is described with reference to FIGS. 4A to 6C.

Note that, in FIGS. 1 to 6C, solid-line arrows indicate flow direction of a mass of the coolant from which the gas is separated (hereinafter, simply referred to as a liquid coolant) and broken-line arrows indicate flow directions of a mass of the coolant in a form of gas-liquid flow which is the liquid coolant mixed with the gas in bubbles (hereinafter, simply referred to as a gas-liquid coolant), or show flow directions of the air.

Figure 4A:
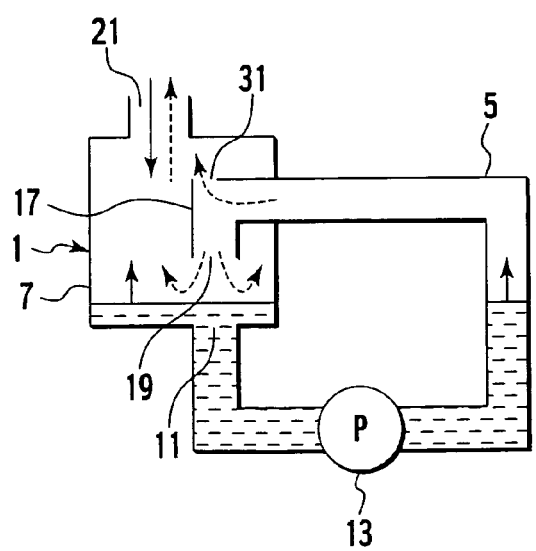
FIG. 4A is a view schematically showing a flow of air and a change of a liquid level at an initial stage of coolant supply, in the reservoir tank, the internal duct and a circulation flow path.
Figure 4B:
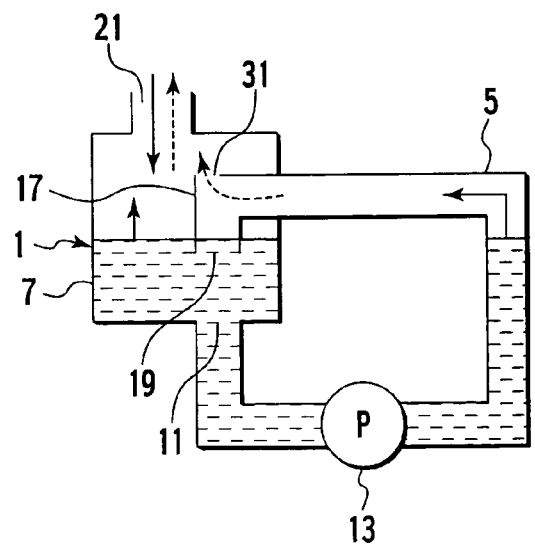
FIG. 4B is a view schematically showing a flow of air and a change of a liquid level at a time of the coolant supply in the fluid circulation system, showing a state where the level of the coolant reaches to a level above an end opening of the internal duct.

First, coolant supply to the container 7 is described with reference to FIGS. 4A and 4B. FIGS. 4A and 4B schematically show flow of air and change in the liquid level at an initial stage of the coolant supply in the reservoir tank 7, the internal duct 17 and the circulation flow path 5.

As the coolant is poured through the filler port 21, the coolant fills in the circulation flow path 5 and has the surface thereof going up in the container 7 as shown in FIG. 4A. The air in the circulation flow path 5 and the internal duct 17 escapes from the end opening 19 and the air bleeder port 31, and is discharged to the outside through the filler port 21. As shown in FIG. 4B, when the coolant surface in the container 7 reaches the end opening 19 and covers the end opening 19, the air in the circulation flow path 5 and the internal duct 17 escape from the air bleeder port 31, and is discharged to the outside through the filler port 21.

Figure 5A:
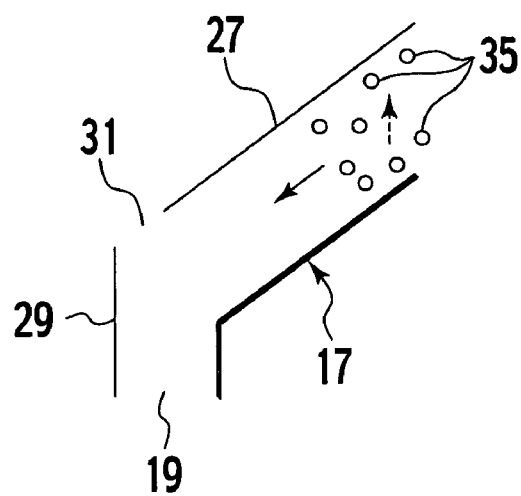
FIGS. 5A to 5D are views schematically showing a behavior of bubbles in the vicinity of an air bleeder port provided on the internal duct of FIG. 1.
Figure 5B:
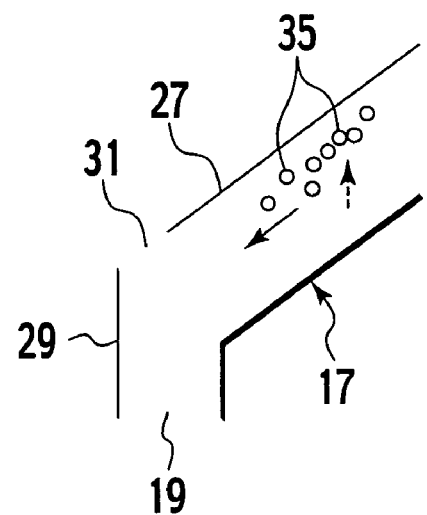

Next, circulation of the coolant is described with reference to FIGS. 5A to 5D and 6A to 6C. FIGS. 5A to 5D schematically show a behavior of bubbles in the vicinity of the air bleeder port 31 provided in the internal duct 17 of FIG. 1. FIGS. 6A to 6C schematically show movement of the bubbles in the vicinity of the end opening 19.

The gas-liquid coolant flows through the circulation system and returns to the reservoir tank 1. As shown in FIG. 1, the gas-liquid coolant flows from the inlet 9 of the reservoir tank 1 into the horizontal portion 25 of the internal duct 17. Then, as shown in FIG. 5A, the gas-liquid coolant flows in the inclined portion 27 of the internal duct 17 toward the vertical portion 29. At this time, as shown in FIG. 5B, bubbles 35 mixed in the gas-liquid coolant are carried by the stream of the gas-liquid coolant toward the end opening 19, and rises therein by buoyancy.

Figure 5C:
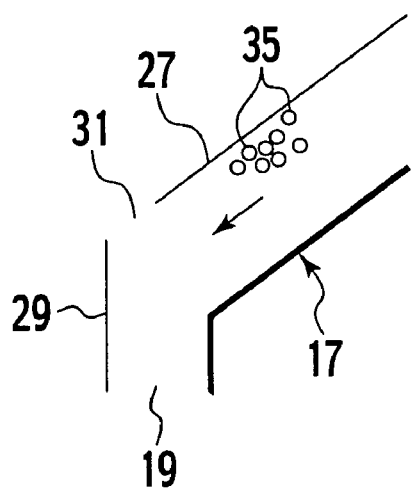
Figure 5D:
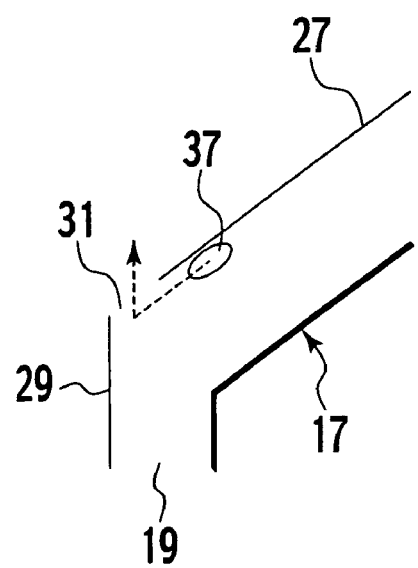
Figure 6A:
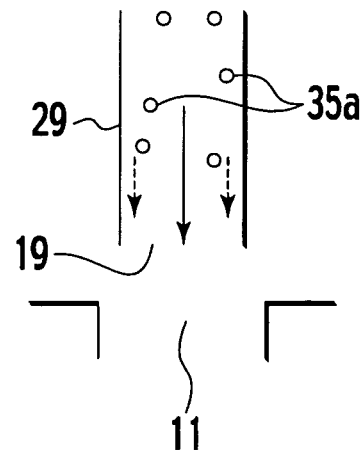
FIGS. 6A to 6C are views schematically showing movement of the bubbles in the vicinity of the end opening.
Figure 6B:
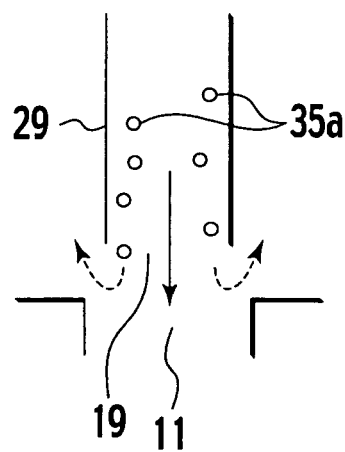
Figure 6C:
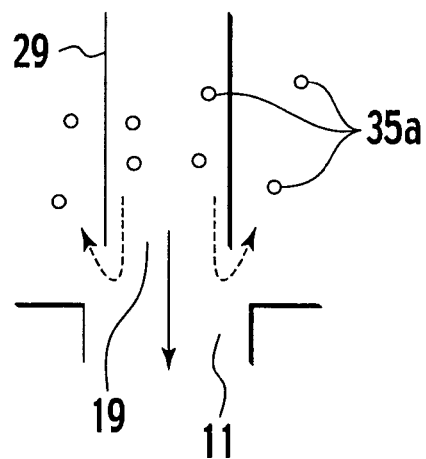

As shown in FIG. 5C, the plurality of bubbles 35 which have moved upward in the inclined portion 27, collect to be an aggregate 37, as shown in FIG. 5D. Thereafter, the aggregate 37 is drifted by the gas-liquid coolant, moves downward along an inner surface of an upper sidewall of the inclined portion 27, passes through the air bleeder port 31, and is released into the liquid coolant in the container 7. Then, the aggregate 37 rises to the liquid coolant surface by buoyancy.

Moreover, as shown in FIG. 6A, the bubbles 35a which have not been discharged from the air bleeder port 31 are carried by the stream of the gas-liquid coolant through the vertical portion 29 toward the end opening 19. At this time, as shown in FIG. 6B, the bubbles 35a move through the vicinity of an inner surface of a sidewall of the vertical portion 29. Thereafter, as shown in FIG. 6C, the bubbles 35a pass through a gap between a peripheral edge portion of the end opening 19 at a lower end of the vertical portion 29 and a peripheral edge portion of the outlet 11 of the container 7, and are released into the liquid coolant in the container 7. Then, the bubbles 35a rise to the fluid surface by buoyancy. Meanwhile, the liquid coolant flows downward through the vertical portion 29, and flows out of the outlet 11 to the circulation flow path 5.

According to the first embodiment, the following effects can be obtained.

The end opening 19 of the internal duct 17 is located below the pump-operated liquid level β, and accordingly, the coolant flowing through the internal duct 17 can be merged into the liquid coolant in the container 7 under the surface thereof. Thus, an impingement of the flowing fluid against the fluid surface is avoided, preventing the drawing/catching of air and forming bubbles in the liquid coolant. Moreover, fluctuations of the liquid coolant surface in the container 7 are suppressed, and accordingly, the bubbles discharged from the end opening 19 quickly rise to the fluid surface in the container 7. Thus, the flowing-out of the bubbles to the outlet 11 is suppressed.

Moreover, the end opening 19 of the internal duct 17 is located above the outlet 11. Therefore, the flowing-out of the bubbles 35a from the outlet 11 is suppressed.

Furthermore, on the sidewall of the internal duct 17, facing to a direction opposite to the direction of gravitational force, the air bleeder port 31 is provided, which allows the space inside the internal duct 17 and the space outside of the internal duct 17 inside the container 7 to communicate with each other. Hence, the bubbles in the gas-liquid coolant are carried by the stream of the coolant in the internal duct 17, and released from the air bleeder port 31 into the liquid coolant the container 7. Thus, the flowing-out of the air to the outlet 11 can be suppressed.

As described above, the flowing-out of the air to the outlet 11 is suppressed, and performance of separating the gas and the fluid in the reservoir tank is enhanced.

Moreover, the provision of the inclined portion 27 of the internal duct 17 contributes to the expansion of a space extended in the gravitational direction in the internal duct 17, which is a space where the gravity exerts on the coolant flowing through the internal duct 17. Thus, the bubbles 35 can easily collect at the upper portion in the inclined portion 27. Moreover, the gas-liquid separation is accelerated while ensuring the flow rate of the coolant.

When the coolant is poured into the container 7, the air in the circulation flow path 5 and the internal duct 17 escape through the air bleeder port 31 into the container 7, thus preventing the air from remaining in the circulation flow path 5 of the circulation system and being mixed to the coolant.

Moreover, the air bleeder port 31 is provided below the pump-operated fluid surface β. Hence, even if the fluid surface drops when the pump 13 is running, the air is prevented from being drawn into the internal duct 17 through the air bleeder port 31 because the air bleeder port 31 is always located below the fluid surface. Furthermore, the air bleeder port 31 is provided at a corner of the internal duct 17 above the end opening 19. The bubbles 35 flowing along the inner surface of the upper portion of the inclined portion 27 are released into a space of the container 7 outside the internal duct 17. Accordingly, the discharge of the bubbles 35 from the end opening 19 is suppressed, thus enhancing efficiency of preventing the gas from flowing out through the outlet 11.

The end opening 19 and the outlet 11 are close to each other and opposed to each other, and the center positions thereof are matched to each other. Thus, the bubbles 35a can be discharged through a gap between the end opening 19 and the outlet 11, while the flow rate of the liquid coolant flowing from the end opening 19 to the outlet 11 is secured with a reduced flow resistance thereof. Thus, efficiency of the entire system can be enhanced.

Moreover, the inner diameter of the end opening 19 is made smaller than the inner diameter of the outlet 11, and accordingly, the flow of the fluid from the end opening 19 is rapidly expanded after the fluid is discharged therefrom. Thus, the bubbles 35a moving along the sidewall of the vertical portion 29 are released into the liquid coolant in the container 7 efficiently. Meanwhile, the liquid coolant flowing through the center area of the vertical portion 29 surely flows to the outlet 11.

Figure 7A:
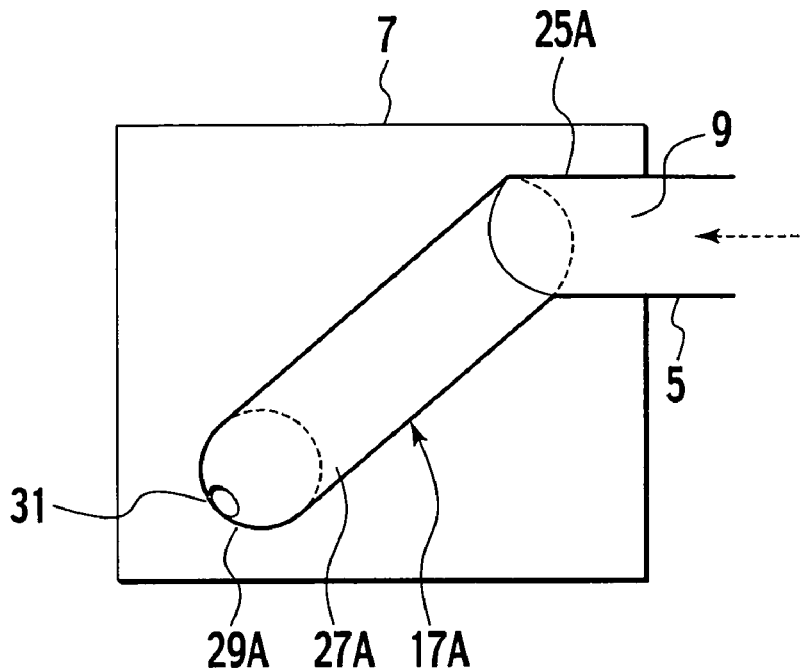
FIGS. 7A and 7B are plan views showing other examples of the internal duct, corresponding to FIG. 3.
Figure 7B:
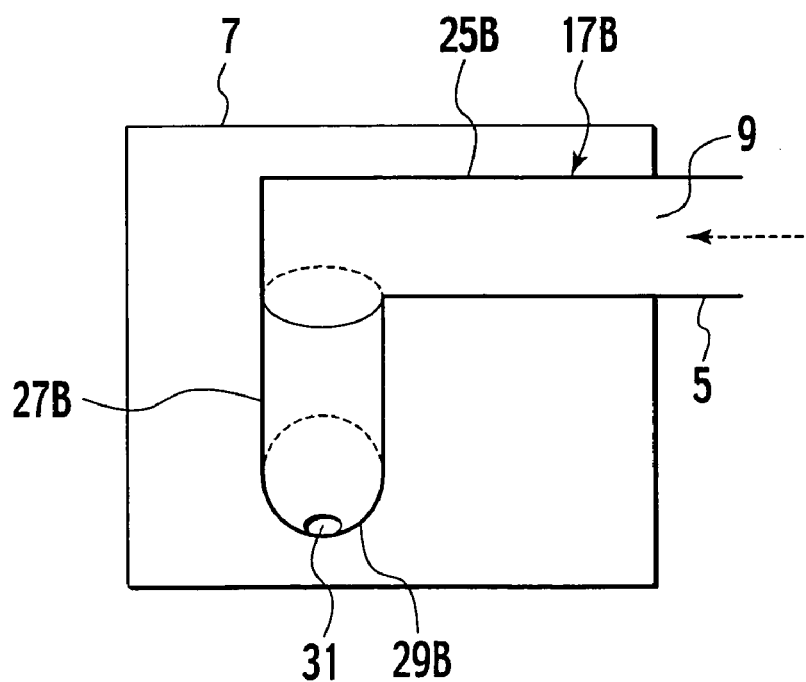

Shape of the internal duct 17 is not limited to the one in the first embodiment. For example, like an internal duct 17A shown in FIG. 7A, a horizontal portion 25A thereof is arranged on one side of the container 7 (upper side in FIG. 7A). A vertical portion 29A is arranged on a side opposite to the horizontal portion 25A (lower side in FIG. 7A). An inclined portion 27A connecting the horizontal portion 25A and vertical portion 29A is extended substantially parallel to a diagonal line of the container 7 in plan view. Moreover, like an internal duct 17B shown in FIG. 7B, a horizontal portion 25B thereof is arranged on one side of the container 7 (upper side in FIG. 7B). The horizontal portion 25B is formed longer than the horizontal portion 25A of FIG. 7A. A downstream end of the horizontal portion 25B and an upstream end of a vertical portion 29B arranged on a side opposite to the horizontal portion 25B (lower side in FIG. 7B) are connected to each other by an inclined portion 27B extended in the vertical direction in FIG. 7B.

Even if the internal duct 17 is formed into the shapes such as those of the internal ducts 17A and 17B described above, similar effects to those in FIG. 1 can be obtained. Even if the shape of the container 7 is changed depending on the shapes of the internal ducts 17A and 17B, efficiency of separating the gas and the liquid is enhanced.

Moreover, though the inner diameter of the end opening 19 is made smaller than that of the outlet 11 in the first embodiment, a relationship between both of the inner diameters is not limited to this. As in a second embodiment shown in FIG. 8, the inner diameter of the outlet 11 and the inner diameter of the end opening 19 can be made approximately equivalent to each other. Moreover, for example, an L shaped partition plate 39 can be provided as a deflector for deflecting a stream of the coolant, to obtain similar effects. The partition plate 39 is fixed to the vertical portion 29 of the inner duct 17 in the following manner. An upper end portion of an upper vertical portion 39a of the partition plate 39 is inserted into the vertical portion 29, and as shown in FIG. 9, both end portions P of the upper vertical portion 39a in the width direction are welded to the inner surface of the sidewall of the vertical portion 29. As shown in FIG. 9, a lower horizontal portion 39b of the partition plate 39 covers in section an approximate half of the end opening 19. A tip end of the lower horizontal portion 39b is extended horizontally and outwardly in a radial direction of the end opening 19.

Figure 8:
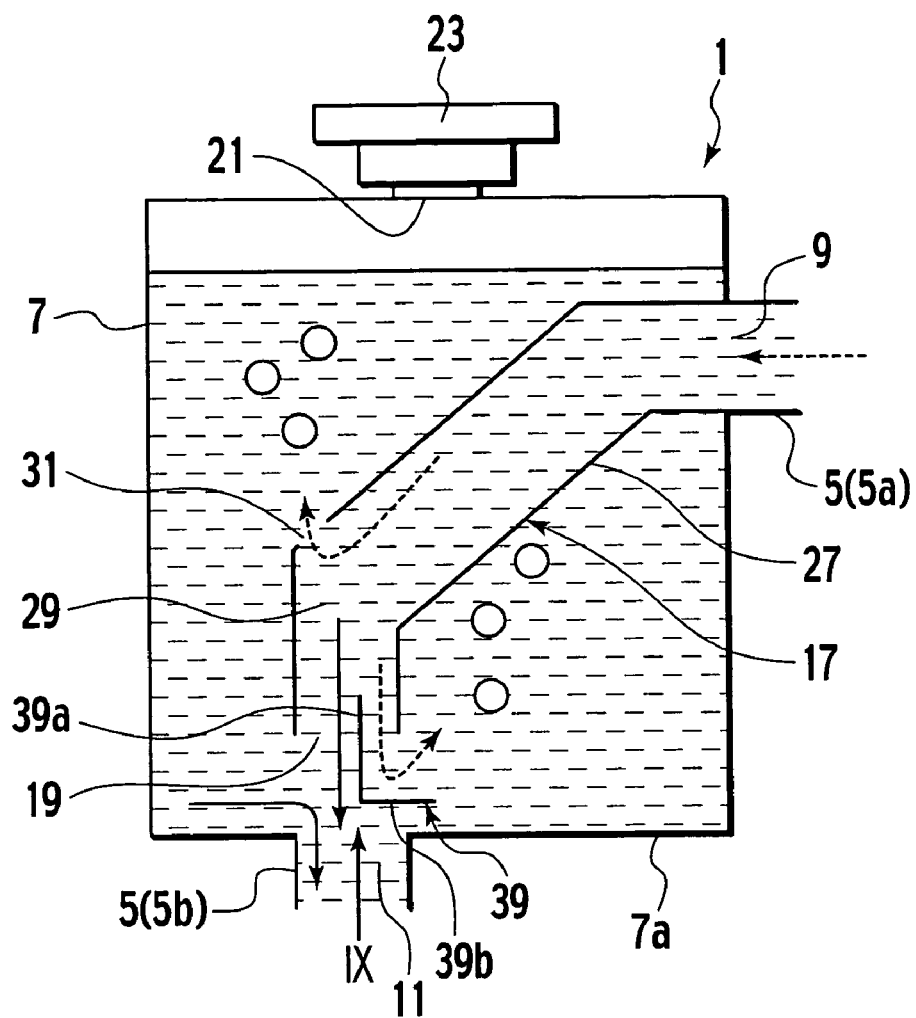
FIG. 8 is a cross-sectional view of a reservoir tank according to a second embodiment of the present invention.
Figure 9:
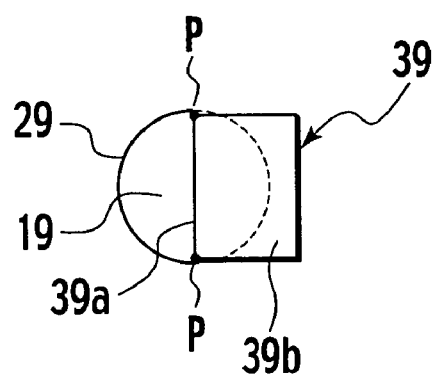
FIG. 9 is a view in arrow IX of FIG. 8 of the reservoir tank.

Thus, among the bubbles 35a flowing along the sidewall of the vertical portion 29, at least the bubbles 35a flowing along a right sidewall in FIG. 8 are prevented from flowing into the outlet 11 by the partition plate 39.

The closer to the right sidewall of the vertical portion 29 the partition plate 39 is located in FIG. 8, the more selectively the bubbles 35a flowing along the sidewall of the vertical portion 29 can be prevented from flowing into the outlet 11. Moreover, though the partition plate 39 is formed in the L shape in FIG. 8, the shape of the partition plate 39 is not limited to this shape. The partition plate 39 may be formed into, for example, V shape, which guides the bubbles 35a from near the sidewall of the vertical portion 29 to an upper portion of the container 7.

Figure 10:
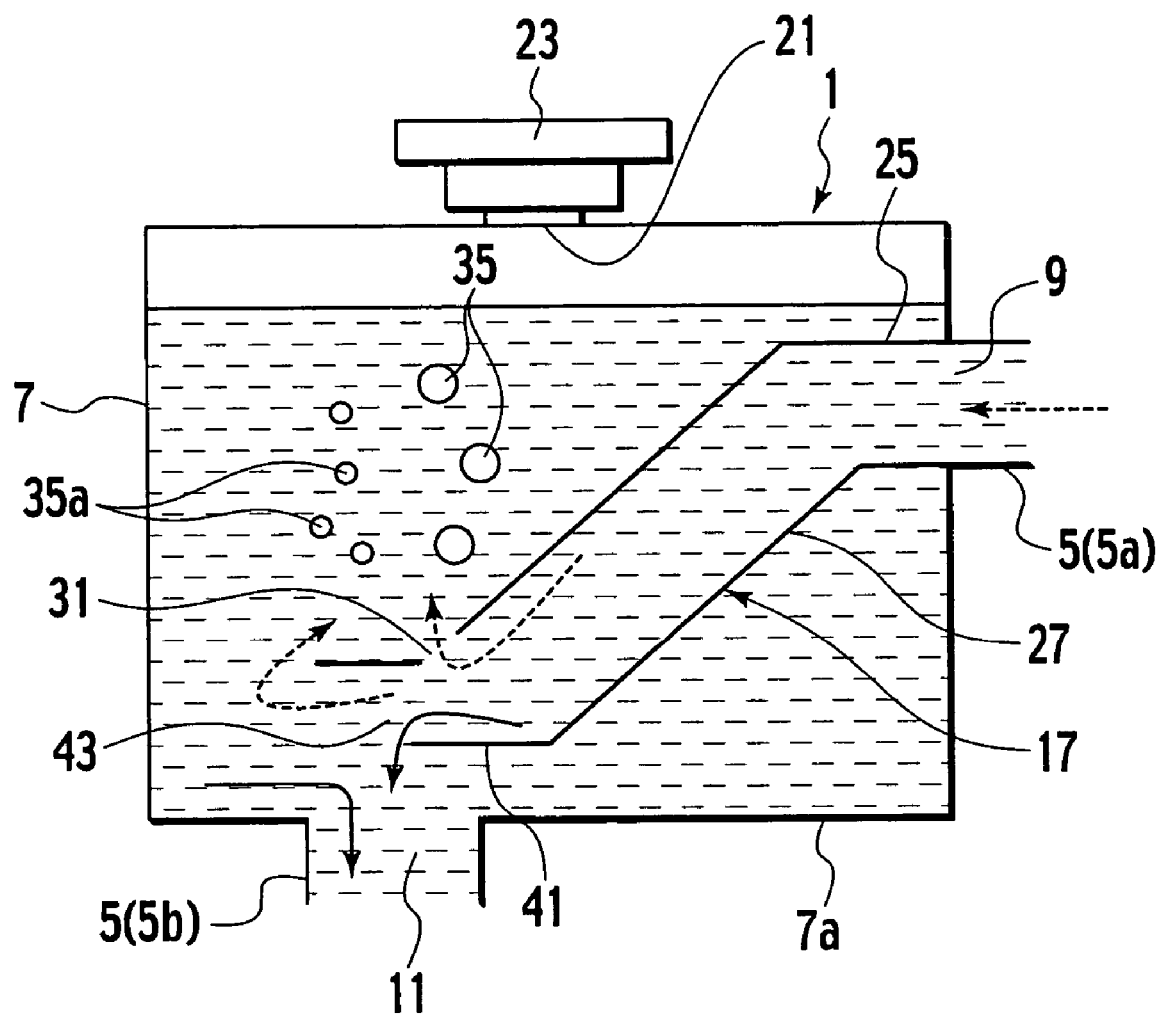
FIG. 10 is a cross-sectional view of a reservoir tank according to a third embodiment of the present invention.

FIG. 10 is a cross-sectional view of a reservoir tank 1 according to a third embodiment of the present invention. In this reservoir tank 1, instead of the vertical portion 29 in the internal duct 17 shown in FIG. 1, a lower horizontal portion 41 as an extended portion is extended substantially horizontally to the left in FIG. 10 from a downstream end of the inclined portion 27. An end opening 43 at a downstream end of the lower horizontal portion 41 is located above the outlet 11, and is open to the left in FIG. 10. The end opening 43 is inclined, and a lower end of a peripheral edge portion of the end opening 43 is recessed more to the right in FIG. 10 than an upper end thereof.

Next, an operation of the third embodiment will be described.

The bubbles 35 contained in the gas-liquid coolant flowing through the internal duct 17, similarly to the first embodiment, move along the inner surface of the upper sidewall of the inclined surface 27 and are discharged from the air bleeder port 31 into the liquid coolant in the container 7 as in the internal duct 17 shown in FIG. 5. The bubbles 35a which have not been discharged from the air bleeder port 31 are given buoyancy to move upward when the coolant flows through the lower horizontal portion 41. The bubbles 35a are thus separated from the liquid coolant, and are discharged from an upper edge portion of the end opening 43 into the liquid coolant in the container 7. After flowing out of the end opening 43, the liquid coolant flows into the outlet 11 together with the liquid coolant present in the bottom of the container 7.

According to the third embodiment of the present invention, the following effects can be obtained.

The end opening 43 is made open in an orientation substantially perpendicular to that of the outlet 11, that is, in the substantially horizontal direction. Accordingly, the bubbles are discharged from the upper edge portion of the end opening 43 into the liquid coolant in the container 7. The liquid coolant flows into the outlet 11, and accordingly, the number of the bubbles flowing into the outlet 11 is further reduced.

Figure 11:
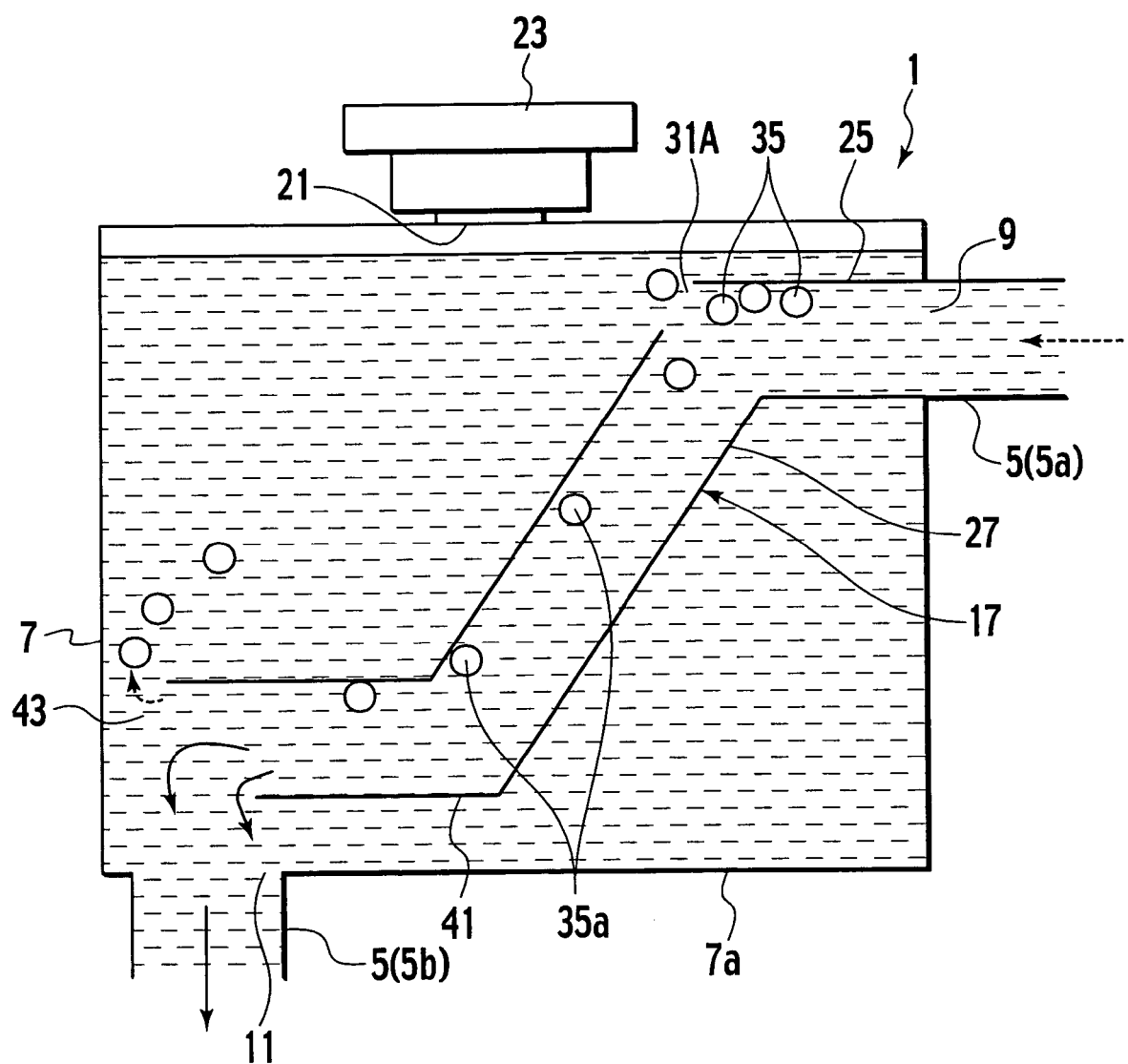
FIG. 11 is a cross-sectional view of a reservoir tank according to a fourth embodiment of the present invention.
Figure 12:
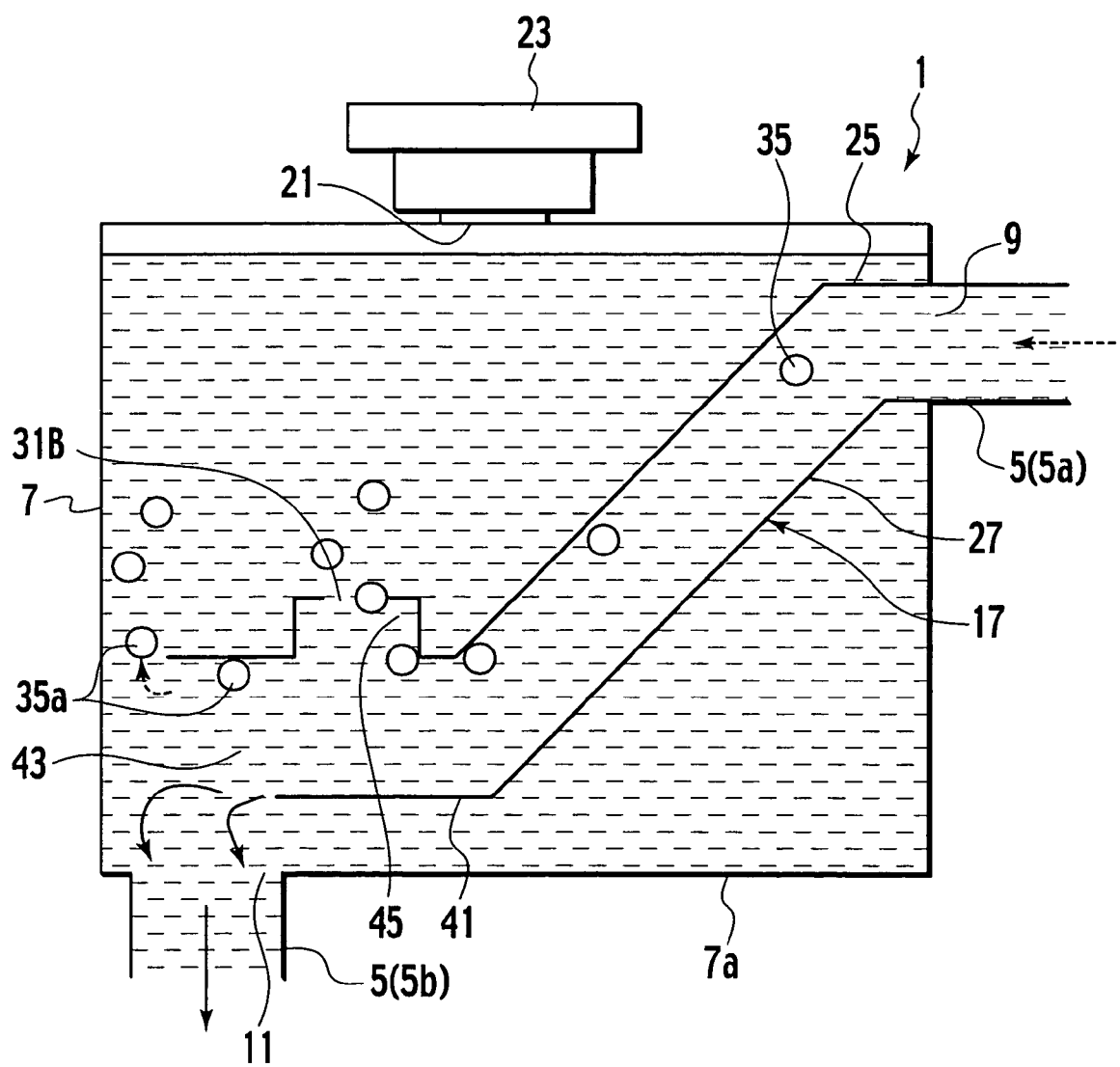
FIG. 12 is a cross-sectional view of a reservoir tank according to a fifth embodiment of the present invention.
Figure 13:
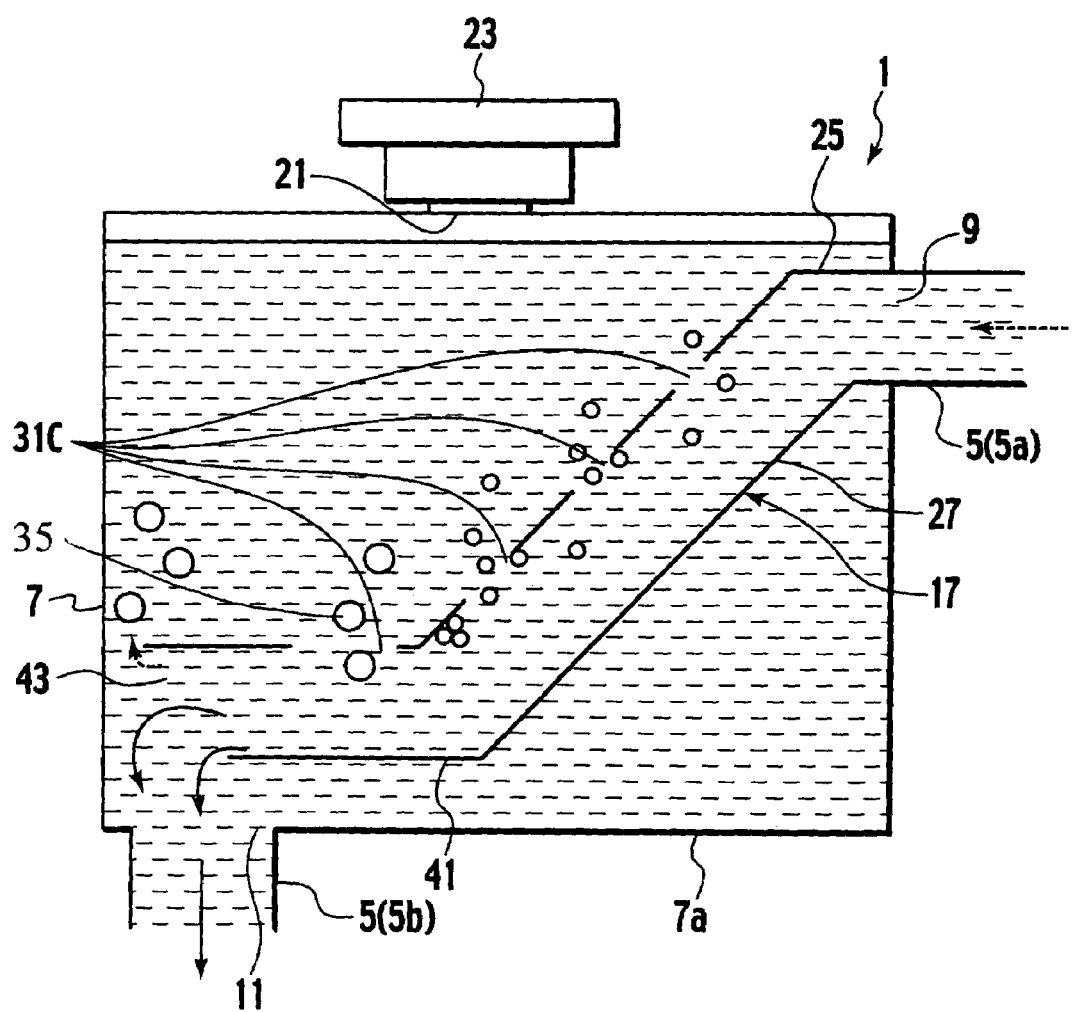
FIG. 13 is a cross-sectional view of a reservoir tank according to a sixth embodiment of the present invention.

Note that, as shown in FIGS. 11 to 13, the bubbles in the internal duct 17 can be discharged into the liquid coolant in the container 7 more efficiently by changing position of the air bleeder port 31, the number of the air bleeder port 31 or installation method thereof.

In a fourth embodiment of the present invention shown in FIG. 11, instead of the air bleeder port 31 of the third embodiment shown in FIG. 10, an air bleeder port 31A is provided in an upper end region of the upper sidewall of the inclined portion 27, where a positive pressure is applied to by the flow of the gas-liquid coolant from the inlet 9.

To an inner surface of the inclined portion 27 in the vicinity of the air bleeder port 31A, a dynamical pressure of the flow of the gas-liquid coolant flowing from the inlet 9 into the internal duct 17 is applied. The bubbles 35 collected on an upper portion of the horizontal portion 25 are pushed out through the air bleeder port 31A into the liquid coolant in the container 7 by the dynamical pressure. The bubbles 35a which have not been discharged from the air bleeder port 31A flow through a gap between a peripheral edge portion of the end opening 43 and the peripheral edge portion of the outlet 11, and then are released into the liquid coolant in the container 7.

In a fifth embodiment shown in FIG. 12, the internal duct 17 is provided in an upper portion of the lower horizontal portion 41 thereof, with an air reservoir portion (or a flow stagnation chamber) 45 protruding upward, that is, in a direction opposite to the direction of gravitational force. The air reservoir portion 45 forms therein a space protruding upward. The air reservoir portion 45 is provided on an upper end of, with an air bleeder port 31B which corresponds to the air bleeder port 31 in the third embodiment shown in FIG. 10.

As shown in FIGS. 5A to 5D, the bubbles 35 contained in the gas-liquid coolant move downward along the inner surface of the upper sidewall of the inclined portion 27 and upward in the inclined portion 27 by buoyancy. During this period, the bubbles 35 collect in the air reservoir portion 45 to be an aggregate. The bubbles 35 are then released into the liquid coolant in the container 7 from the air bleeder port 31B provided in the air reservoir portion 45.

The bubbles 35a which have not been discharged from the air bleeder port 31B are discharged from the end opening 43 into the liquid coolant in the container 7 through the gap between the peripheral edge portion of the end opening 43 and the peripheral edge portion of the outlet 11. The air reservoir portion 45 with the air bleeder port 31B may be provided in the inclined portion 27.

In a sixth embodiment of the present invention shown in FIG. 13, a plurality of air bleeder ports 31C are provided in upper sidewalls of the inclined portion 27 and lower horizontal portion 41 of the internal duct 17, instead of the air bleeder port 31 of the third embodiment of FIG. 10. These air bleeder ports 31C are formed so that the size of each port gradually increases from the inlet 9 toward the end opening 43.

Hence, the bubbles 35 which have not been discharged from an upper or upstream air bleeder port 31C among the plurality of air bleeder ports 31C are discharged from another air bleeder port 31C located downstream thereof. The discharge of the bubbles 35 is repeated in a similar way at the air bleeder ports 31C located further downstream, and the separation of the gas and the liquid is accelerated. The bubbles which have not been discharged from any of the plurality of air bleeder ports 31C are discharged into the liquid coolant in the container 7 through the gap between the peripheral edge portion of the end opening 43 and the peripheral edge portion of the outlet 11.

Figure 14:
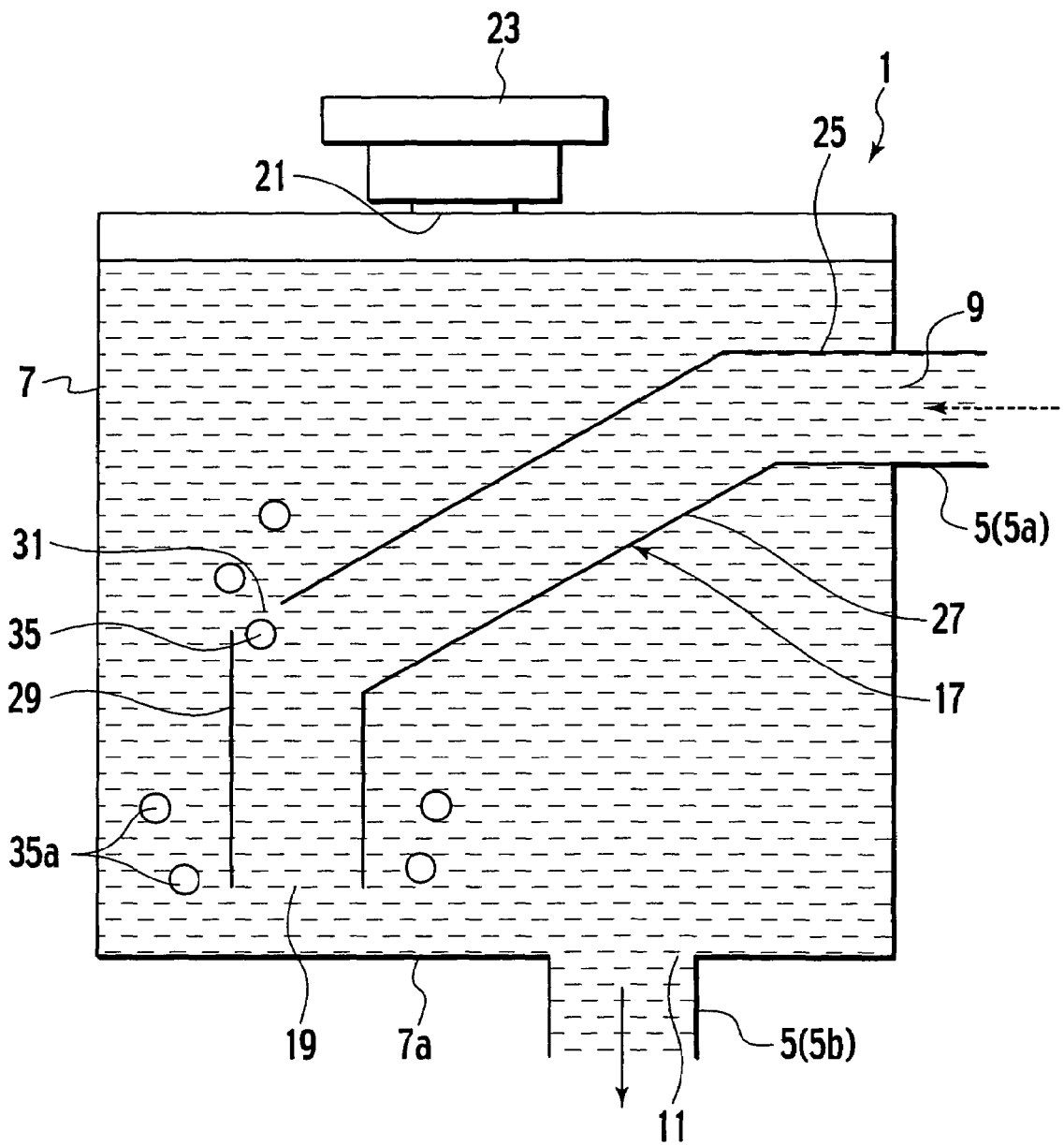
FIG. 14 is a cross-sectional view of a reservoir tank according to a seventh embodiment of the present invention.

FIG. 14 is a cross-sectional view of a reservoir tank 1 according to a seventh embodiment of the present invention. In this embodiment, unlike the first embodiment, the outlet 11 is set off aside of the end opening 19 of the internal duct 17 in the horizontal direction (right direction in FIG. 14).

Thus, the bubbles 35a discharged from the end opening 19 of the internal duct 17 can be surely prevented from flowing out to the outlet 11, and the function to separate the gas and the liquid can be further enhanced.

Figure 15:
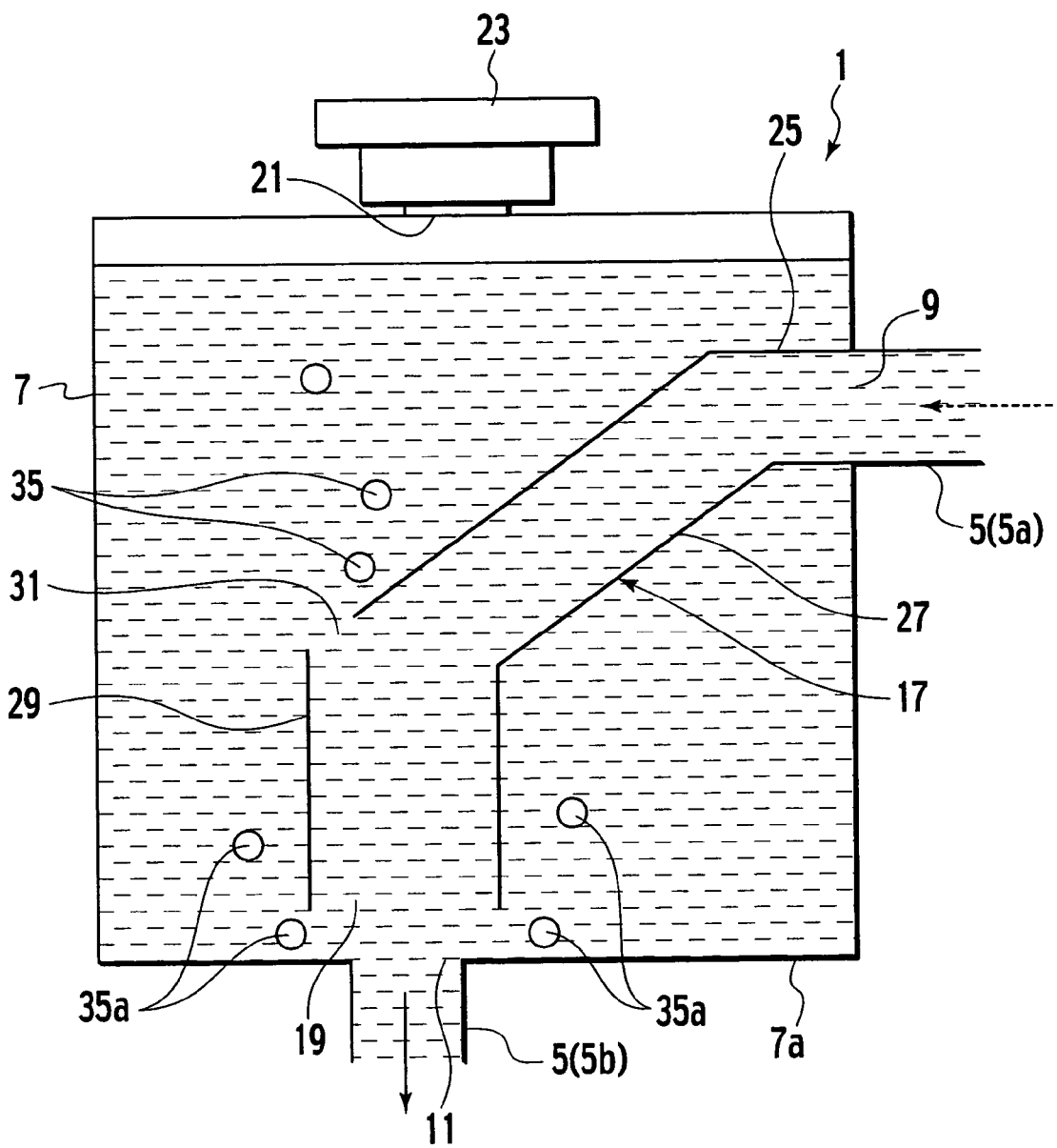
FIG. 15 is a cross-sectional view of a reservoir tank according to an eighth embodiment of the present invention.

FIG. 15 is a cross-sectional view of a reservoir tank 1 according to an eighth embodiment of the present invention. In this embodiment, unlike the first embodiment, the end opening 19 of the internal duct 17 is formed such that the inner diameter thereof is larger than the inner diameter of the outlet 11.

In this case, the bubbles 35a flowing downward along the inner surface of the sidewall of the vertical portion 29, as shown in FIGS. 6A to 6C, flow out of the end opening 19 to the peripheral area on the outside of the outlet 11. Hence, the bubbles 35a can more surely be prevented from flowing out to the outlet 11.

The inner diameter of the end opening 19 is smaller than the inner diameter of the outlet 11 in the first embodiment, wherein the coolant after being subjected to the separation of the gas and the liquid smoothly flows into the outlet 11, with better flowing-in characteristics as compared with the eighth embodiment while.

Figure 16A:
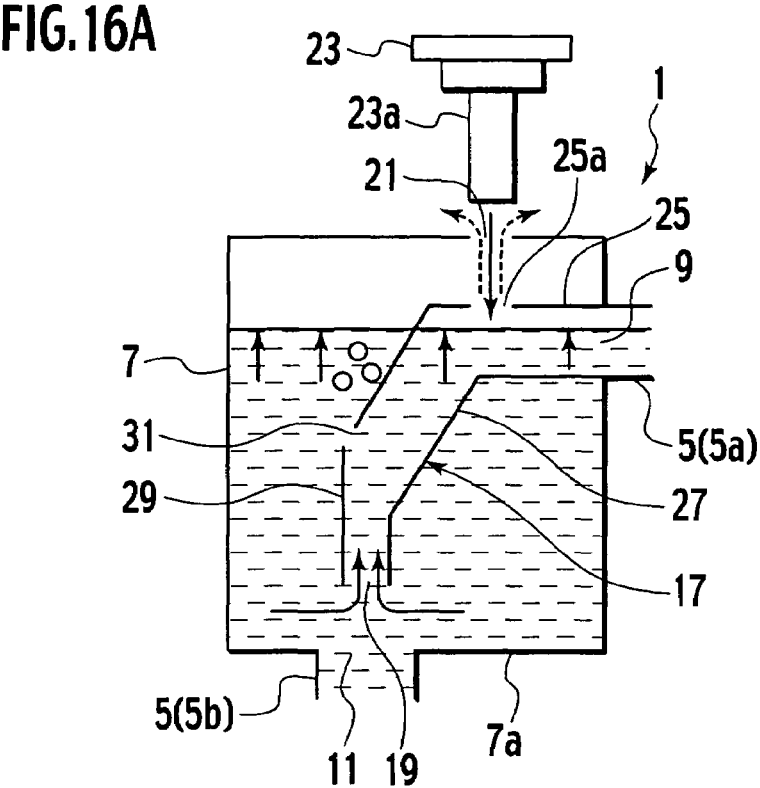
FIG. 16A is a cross-sectional view of a reservoir tank according to a ninth embodiment of the present invention, showing a state where the coolant is poured into the reservoir tank.
Figure 16B:
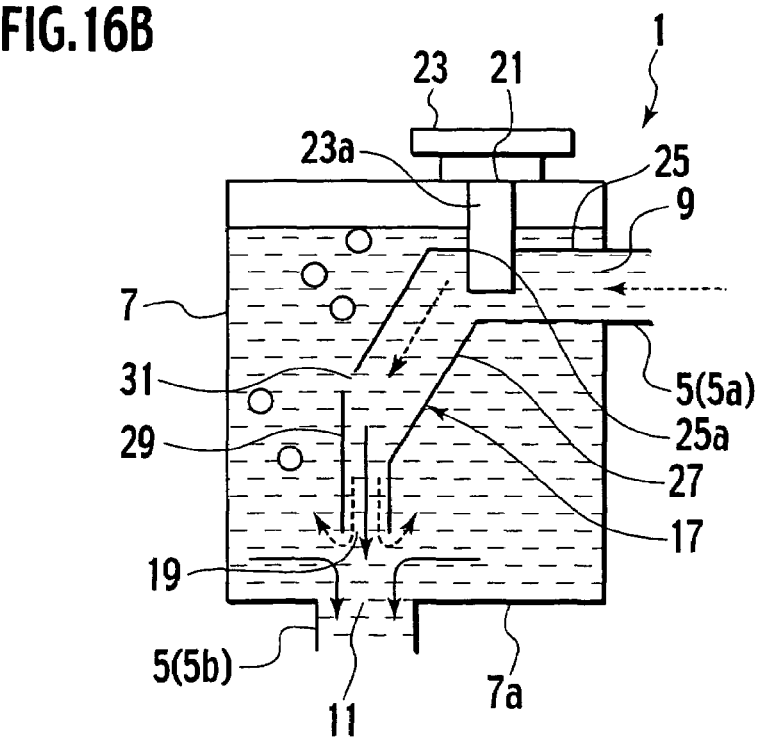
FIG. 16B is a cross-sectional view of the reservoir tank according to the ninth embodiment of the present invention, showing a state where the coolant is circulated therein.

FIGS. 16A and 16B are cross-sectional views of a reservoir tank 1 according to a ninth embodiment of the present invention. In this embodiment, the horizontal portion 25 of the internal duct 17 is provided with a through hole 25a in an upper sidewall thereof at a position opposite to the filler port 21 and directly below the filler port 21. A cap 23 for closing the filler port 21 has a cylindrical plug portion 23a extended downward from a lower surface of the cap 23. As shown in FIG. 16B, the cylindrical plug portion 23a is inserted into the through hole 25a as the cap 23 is attached to the filler port 21. Specifically, the filler port 21 and the through hole 25a are closed simultaneously.

Next, an operation of the ninth embodiment is described.

As shown in FIG. 16A, the coolant has its surface gradually going up in the container 7 and the internal duct 17, when being poured through the filler port 21. As the fluid surfaces in the container 7 and the internal duct 17 rise, the air in the internal duct 17 is discharged to the outside through the through hole 25a.

After the supply of the coolant is completed, as shown in FIG. 16B, the filler port 21 is closed by the cap 23. At this time, the through hole 25a is also closed by a tip end portion of the cylindrical plug portion 23a. Even if a negative pressure is applied to the inner surface of the sidewall of the internal duct 17 in the vicinity of the through hole 25a when the coolant flows through the internal duct 17, the air in the container 7 can be prevented from being drawn into the flow in the internal duct 17 through the through hole 25a.

Figure 17A:
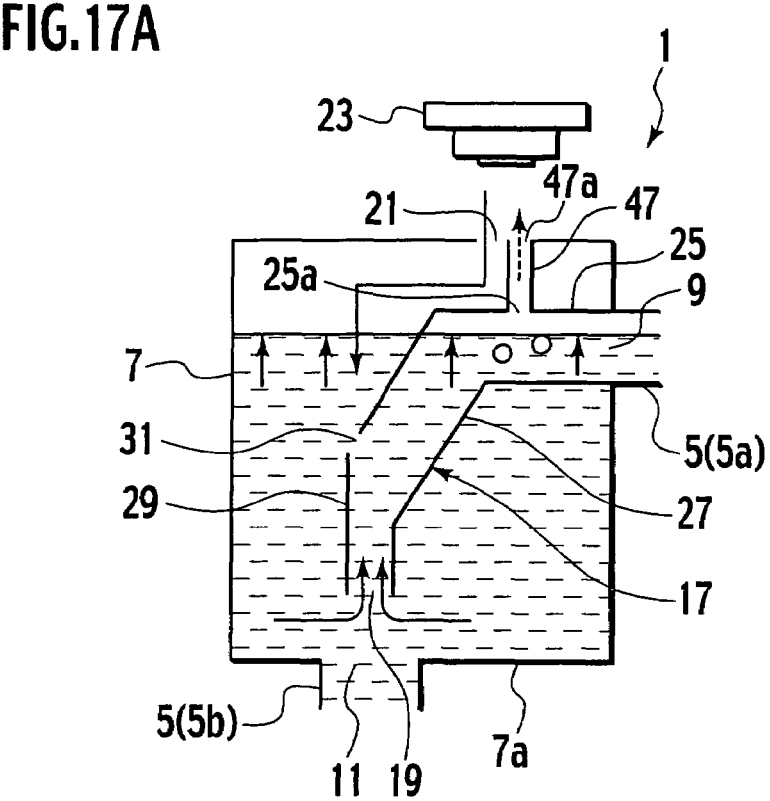
FIG. 17A is a cross-sectional view of a reservoir tank according to a tenth embodiment of the present invention, showing a state where the coolant is poured into the reservoir tank.
Figure 17B:
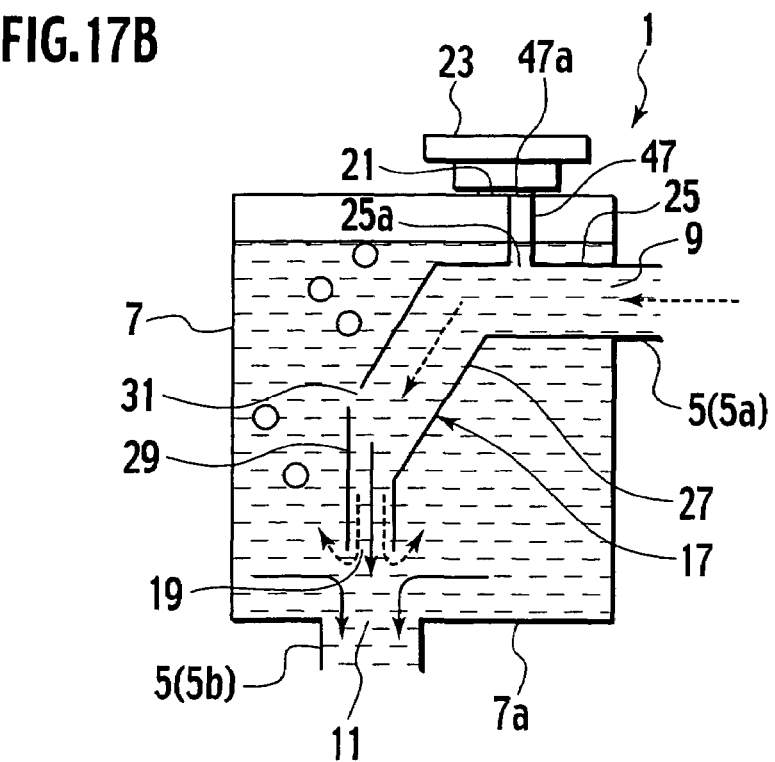
FIG. 17B is a cross-sectional view of the reservoir tank according to the tenth embodiment of the present invention, showing a state where the coolant is circulated and flows therein.

FIGS. 17A and 17B are cross-sectional views of a reservoir tank 1 according to a tenth embodiment of the present invention. This embodiment is a modification example of the ninth embodiment in which the filler port 21 is formed such that an inner diameter thereof is larger than a diameter of the through hole 25a provided on the horizontal portion 25 of the internal duct 17. Furthermore, between the filler port 21 and the internal duct 17, provided is an extended communication tube 47 which is connected to the through hole 25a at a lower end thereof and is extended through the filler port 21 to have a upward opening 47a at an upper end thereof.

The cap 23 comes into intimate contact with the upper end of the extended communication tube 47, and closes the upper end opening 47a thereof when being attached to the filler port 21.

In this embodiment, as shown in FIG. 17A, as the coolant is poured through the filler port 21, the fluid surface of the coolant gradually goes up in the container 7 and the internal duct 17. As the fluid surface in the container 7 and the internal duct 17 rises, the air in the internal duct 17 is discharged to the outside through the extended communication tube 47.

Then, as shown in FIG. 17B, the extended communication tube 47 is also closed by setting the cap 23 to the filler port 21. Thus, as in the ninth embodiment, the through hole 25a is hermetically closed, and accordingly, when the coolant flows through the internal duct 17, the air in the container 7 can be prevented from being drawn into the flow of the internal duct 17 through the through hole 25a.

Figure 18A:
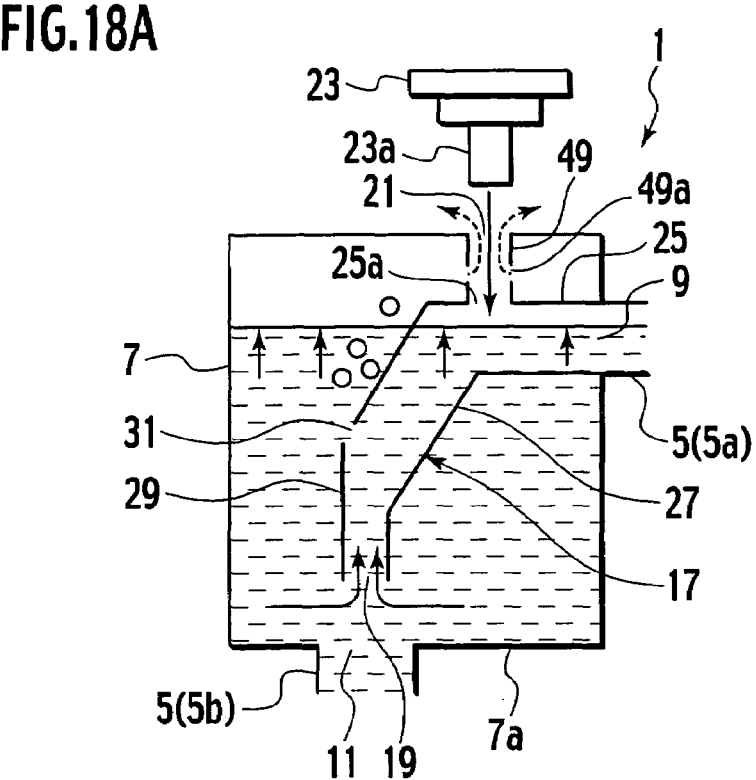
FIG. 18A is a cross-sectional view of a reservoir tank according to an eleventh embodiment of the present invention, showing a state where the coolant is poured into the reservoir tank.
Figure 18B:
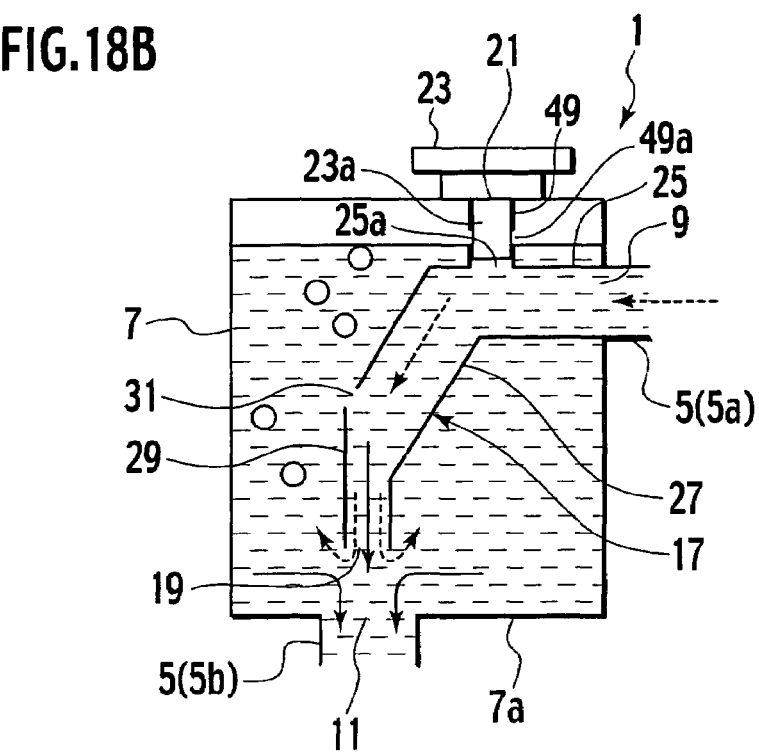
FIG. 18B is a cross-sectional view of the reservoir tank according to the eleventh embodiment of the present invention, showing a state where the coolant is circulated and flows therein.

FIGS. 18A and 18B are cross-sectional views of a reservoir tank 1 according to an eleventh embodiment of the present invention. This embodiment is another modification example of the ninth embodiment. The filler port 21 and the through hole 25a are connected to each other by a connecting tube 49. The connecting tube 49 is provided on a sidewall thereof with a communication hole 49a which allows the space inside the connecting tube 49 and the space outside of the connecting tube 49 inside the container 7, to communicate with each other. When the cap 23 is attached to the filler port 21, as shown in FIG. 18B, the cylindrical plug portion 23a of the cap 23 is inserted into the connecting tube 49, and a lateral side of the cylindrical plug 23a closes the through hole 49a. In such a way, the filler port 21 and the communication hole 49a are closed by attaching the cap 23 to the filler port 21. Thus, as in the ninth embodiment, the through hole 25a is hermetically closed, and accordingly, when the coolant flows through the internal duct 17, the air in the container 7 can be prevented from being drawn into the flow of the internal duct 17 through the through hole 25a.

Figure 19:
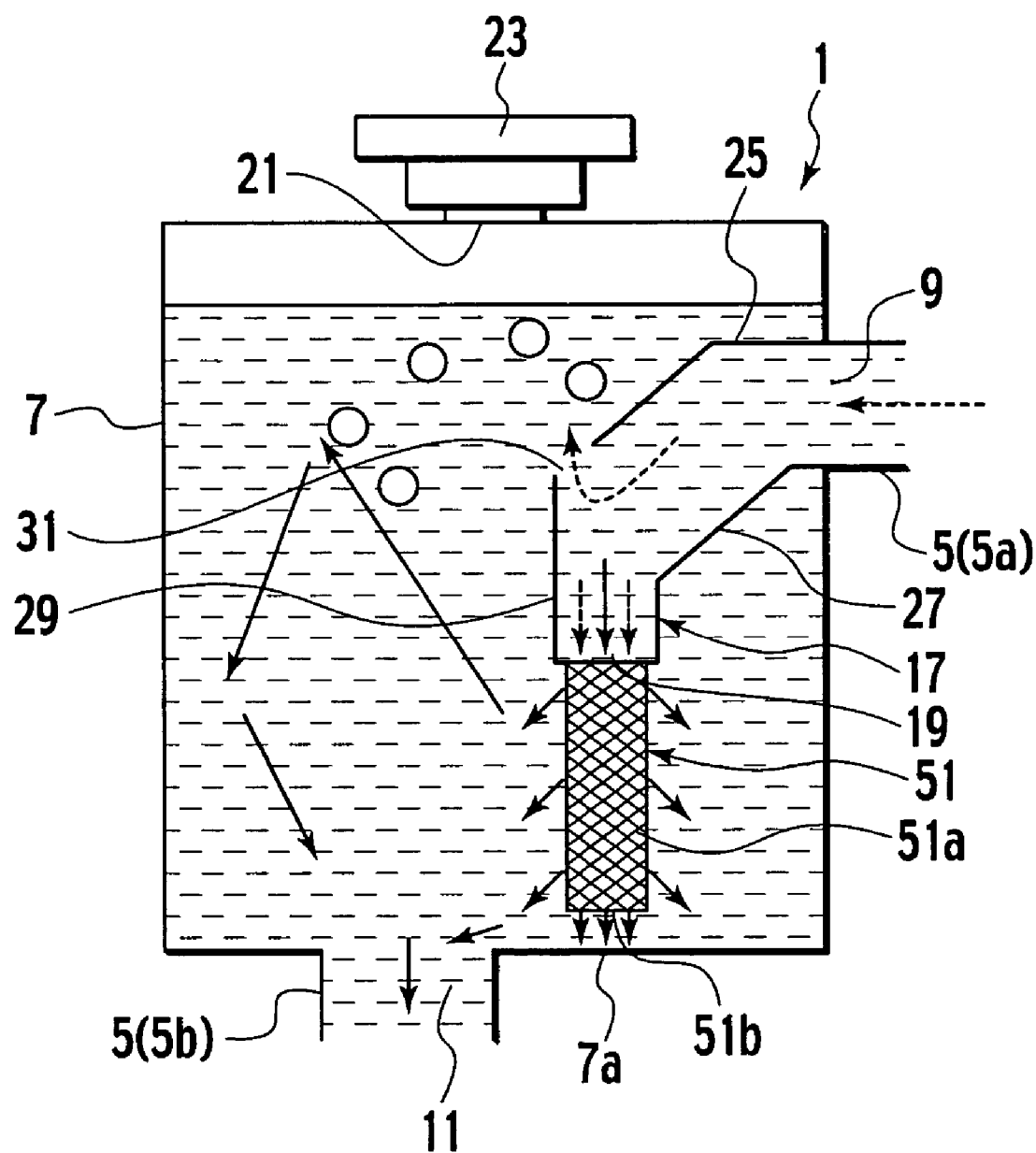
FIG. 19 is a cross-sectional view of a reservoir tank according to a twelfth embodiment of the present invention.

FIG. 19 is a cross-sectional view of a reservoir tank 1, showing a twelfth embodiment of the present invention. In this reservoir tank 1, the end opening 19 of the internal duct 17 is located apart from the bottom 7a and set off aside of the outlet 11 in the horizontal direction. A tubular filter 51 is detachably provided in the end opening 19, which removes foreign objects in the coolant flowing out of the internal duct 17 into the container 7. The entire body of the tubular filter 51 is placed in the fluid in the container 7.

The tubular filter 51 is a screen formed in a cylindrical shape. A lateral sidewall portion 51a of the tubular filter 51 and a tip end portion 51b covering a lower end opening of the lateral sidewall portion 51a are both made of screen material through which the coolant passes. The lateral sidewall portion 51a has a length L in the vertical direction larger than an inner diameter D thereof. By forming the tubular filter 51 in such a configuration, flow velocity or flow rate per unit area of the coolant flowing through the tubular filter 51 is greater in the tip end portion 51b than in the lateral sidewall portion 51a. The tip end portion 51b is located in the vicinity of the bottom 7a of the container 7.

Next, an operation of the twelfth embodiment is described.

The gas-liquid coolant which has flown into the container 7 from the inlet 9 passes through the internal duct 17, is subjected to the gas-liquid separation as in the first embodiment, flows out of the end opening 19, and reaches the tubular filter 51 located below the fluid surface.

Most of the coolant flows out of the tip end portion 51b of the tubular filter 51 due to its inertia or a dynamical pressure related to the flow velocity at the end opening 19. Rest of the coolant flows out of the lateral sidewall portion 51a of the tubular filter 51 at a flow velocity lower than that at the tip end portion 51b.

Both of the tip end portion 51b of the tubular filter 51 and the outlet 11 of the container 7 are located in the vicinity of the bottom 7a apart from the fluid surface or on the bottom 7a. Hence, the coolant flows out of the tip end portion 51b directly to the outlet 11. Thus, fluctuations of the fluid level of the coolant in the container 7 can be suppressed, and as in the first embodiment, the function to separate the gas and the liquid is enhanced.

The coolant which has flown out of the lateral sidewall portion 51a of the tubular filter 51 at the low flow velocity slowly circulates and flows to the outlet 11 in the container 7. While the coolant is circulating, the bubbles contained in the coolant rise to the fluid surface. In such a way, the performance of separating the gas and the liquid is exerted.

All of the coolant flows out below the fluid surface in the container 7 through the tubular filter 51. A portion from which the coolant flows out most in the tubular filter 51, that is, the tip end portion 51b is located at a position deep and sufficiently apart from the fluid surface. Therefore, most of the coolant which has flown out of the tubular filter 51 flows to the outlet 11 without reaching the vicinity of the fluid surface. Only a very small amount of the coolant containing the air reaches the vicinity of the fluid surface at the low flow velocity. Therefore, the fluctuation of the fluid surface is suppressed, the air in the container 7 is prevented from being caught in the coolant at the fluid surface, which may be caused by the fluctuation of the fluid surface, and stable performance of separating the gas and the liquid is ensured.

Moreover, most of the coolant flowing through the tubular filter 51 flows out of the tip end portion 51b thereof. The foreign object in the coolant are removed mainly by the tip end portion 51b, and accordingly, clogging occurs in the tip end portion 51b first. On the lateral sidewall portion 51a of the tubular filter 51, the coolant flows inside thereof parallel to the surface thereof, and accordingly, the foreign objects is seldom caught on the lateral sidewall portion 51a. Hence, the lateral sidewall portion 51a maintains its initial condition for a relatively long time. Thus, the tubular filter 51 can maintain its initial performance for a relatively long time from the start of use.

Figure 20A:
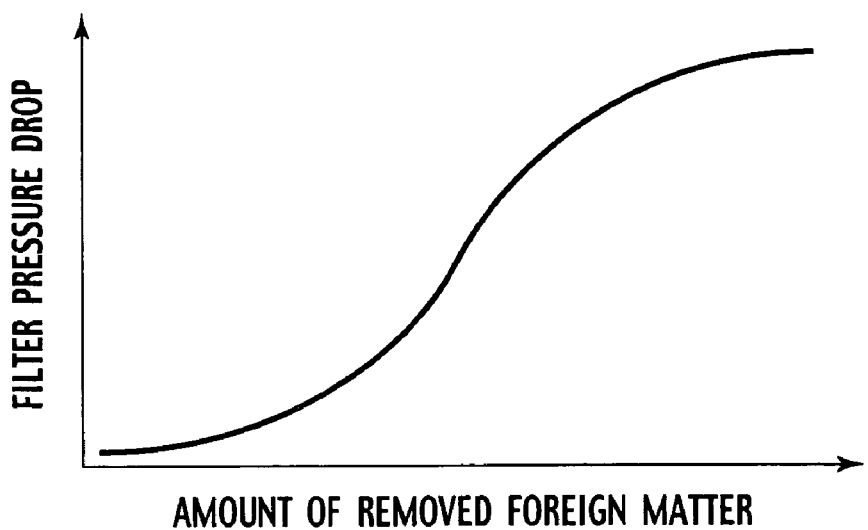
FIG. 20A is a diagram showing a correlation between an accumulated amount of foreign objects and a filter pressure loss in a tubular filter of the twelfth embodiment.
Figure 20B:
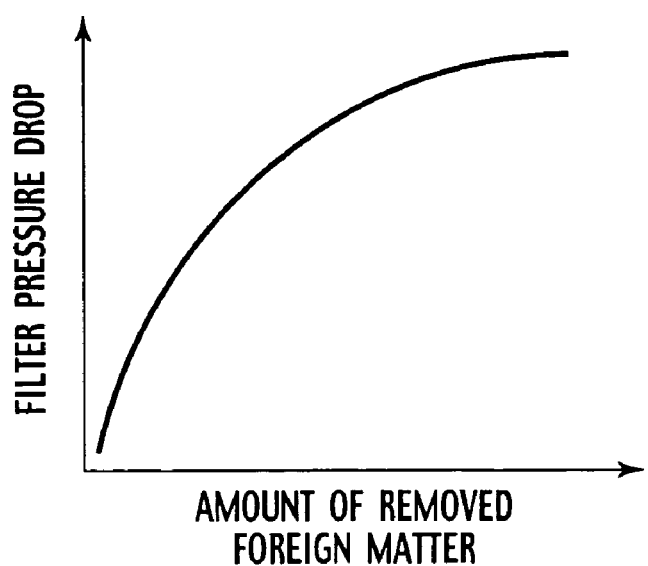
FIG. 20B is a diagram showing a correlation between an accumulated amount of the foreign objects and a filter pressure loss in a conventional filter.
Figure 21:
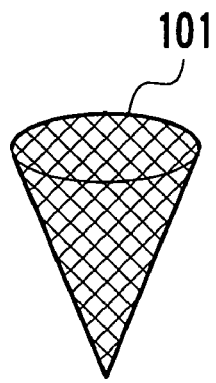
FIG. 21 is a perspective view showing the conventional filter.

FIG. 20A shows correlation between the accumulated amount of foreign objects and the filter pressure loss in the tubular filter 51. FIG. 20B shows correlation between the accumulated amount of the foreign objects and the filter pressure loss in the conventional filter 101 shaped in a circular cone as shown in FIG. 21.

Figure 22:
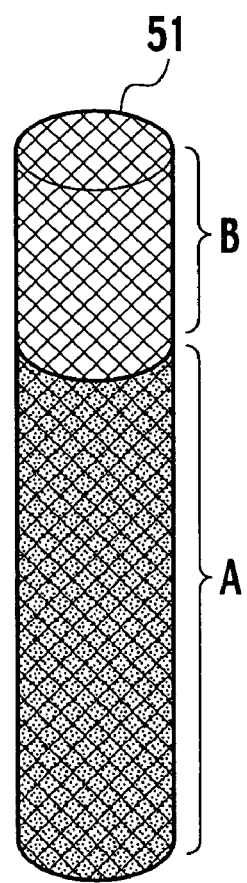
FIG. 22 is a perspective view showing the tubular filter according to the twelfth embodiment.

According to the above, in the case of the tubular filter 51 in accordance with this embodiment, for example as shown in FIG. 22, even if a portion A on a tip end side (lower side in FIG. 22) is clogged due to the foreign objects, a portion B which is not clogged yet is present on a base end side thereof. Hence, as compared with a filter 101 in FIG. 21, in which the clogging occurs in the entire body evenly, the pressure loss of the filter can be maintained low for a long period of time, whereby a frequency of exchanging the filter is reduced.

Figure 23:
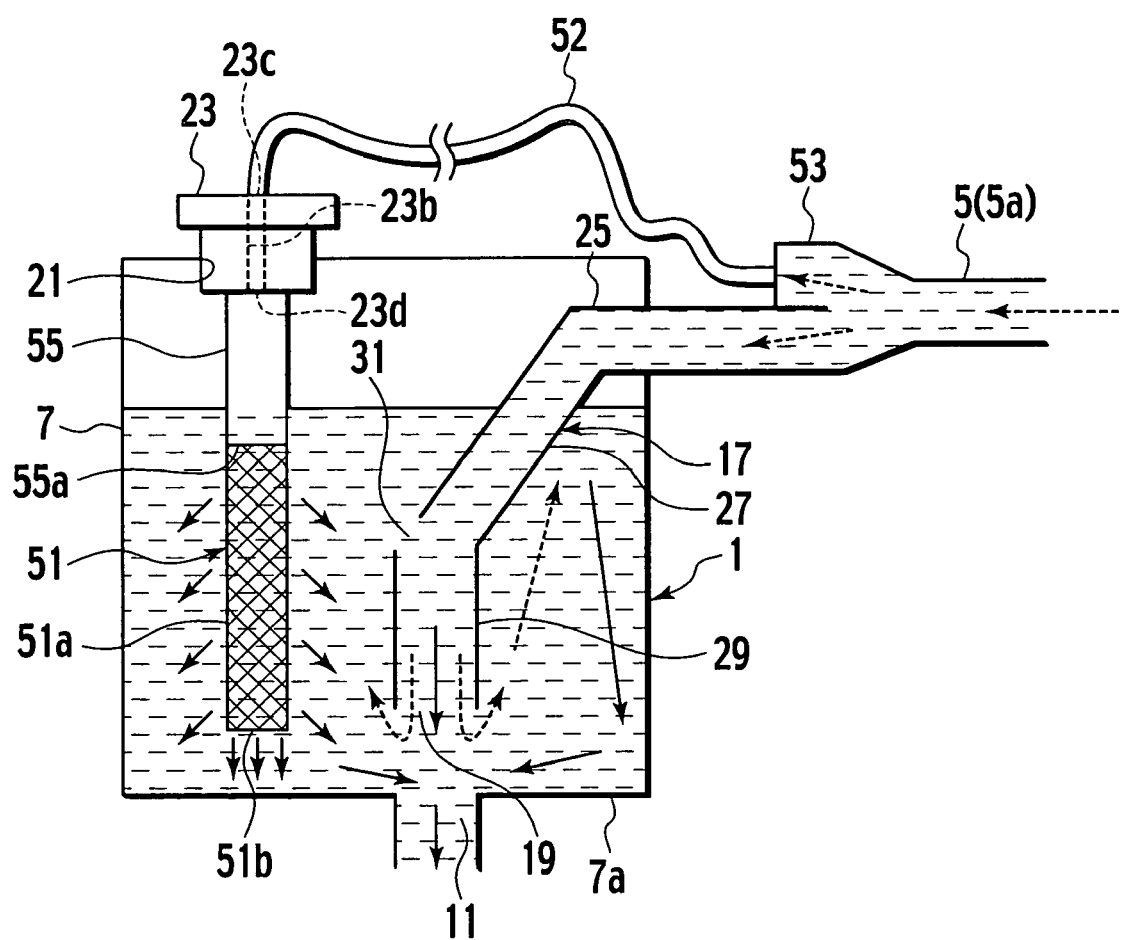
FIG. 23 is a cross-sectional view of a reservoir tank according to a thirteenth embodiment of the present invention.

FIG. 23 is a cross-sectional view of a reservoir tank 1, showing a thirteenth embodiment of the present invention. In this embodiment, the cap 23 is provided with a communication hole 23b which allows a space inside the container 7 and a space outside thereof to communicate with each other when the cap 23 is fitted to the filler port 21. A flexible hose 52 is detachably connected at one end thereof to an upper opening 23c of the communication hole 23b, which serves as an inlet provided on the cap 23 outside of the container 7. The other end of the hose 52 is connected to a branch portion 53 provided on the first flow path 5a of the circulation flow path 5. Instead of the flexible hose 52, a freely movably jointed tube may be used.

To a lower end face of the cap 23 inside the container 7, an upper end of an extended tube 55 is detachably connected. The extended tube 55 communicates with the communication hole 23b through a lower opening 23d thereof on the inside of the container 7. A lower end 55a of the extended tube 55 is located in the liquid coolant in the container 7.

An upper end of the tubular filter 51 similar to that of the twelfth embodiment is detachably connected to the lower end 55a of the extended tube 55. The tip end portion 51b of the tubular filter 51 is located in the vicinity of the bottom 7a of the container 7 as in the twelfth embodiment. An internal duct 17 is similar to that in the first embodiment.

Next, an operation of the thirteenth embodiment is described.

With regard to the gas-liquid coolant which comes flowing through the first flow path 5a of the circulation flow path 5, some of the gas-liquid coolant flows into the internal duct 17 and is subjected to the separation of the gas and the liquid as in the first embodiment, and the rest of the gas-liquid coolant flows through the branch portion 53, the hose 52, and the cap 23, and through the communication hole 23b of the cap 23, the extended tube 55, and reaches the tubular filter 51.

In the tubular filter 51, as in the twelfth embodiment, most of the coolant flows out of the tip end portion 51b at high flow velocity. The residual coolant flows out of the lateral sidewall portion 51a of the tubular filter 51 at flow velocity lower than that of the tip end portion 51b. Hence, the foreign objects in the coolant are removed mainly by the tip end portion 51b. The lateral sidewall portion 51a maintains the same condition as in an initial stage for a relatively long time. Thus, the tubular filter 51 can maintain its initial performance for a relatively long time from the start of use.

In this embodiment, the cap 23 and the first flow path 5a of the circulation flow path 5 are connected to each other by the flexible hose 52. The tubular filter 51 can be exchanged together with the cap 23, detaching the hose 52 from the cap 23. Only the tubular filter 51 can be exchanged, detaching the tubular filter 51 from the cap 23.

When the filter is installed in the piping system outside of the container 7, it is necessary to drain a large amount of coolant in the system when the filter is exchanged, and workability becomes deteriorated. In this embodiment, such draining work is not necessary, and the work of exchanging the filter can be conducted easily in a short time. Moreover, though it is necessary to install valves upstream and downstream the filter in order to enable the filter exchange without drainage, the valves and the like are not required in this embodiment, and a weight reduction can be achieved.

The work of exchanging the filter becomes facilitated, and a person who is not a skilled technician can exchange the filter. In the case the screen's mesh size is made finer to enhance filtering performance and the exchange frequency is increased, a common user can perform the exchange work, and accordingly, work efficiency is enhanced as a whole.

Moreover, the gas-liquid coolant which flows through the first flow path 5a of the circulation flow path 5 can be divided at an appropriate ratio into a main stream flowing through the internal duct 17 and a bypass flow flowing though the cap 23. Thus, even if a large amount of foreign objects are included in the coolant and the entire tubular filter 51 becomes clogged, the coolant flows through the main tube (internal duct 17), thus making it possible to prevent a great reduction of the amount of circulated coolant. Moreover, since the main tube (internal duct 17) does not include the tubular filter 51, more coolant is discharged near the bottom of the container 7, and the performance of separating the gas and the liquid can be further enhanced.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2003-358653, filed on Oct. 20, 2003, and Japanese Patent Application No. 2004-253285, filed on Aug. 31, 2004, the disclosures of which are expressly incorporated herein by reference in their entirety.

What is claimed is:

1. A reservoir tank, comprising:
    a container for storing fluid therein, the container including an inlet through which the fluid flows into the container and an outlet through which the fluid flows out of the container; and
    a duct provided inside the container, the duct being connected to the inlet of the container and having a first opening open inside the container,
    wherein the first opening of the duct is located above the outlet of the container and below a surface of the fluid in the container,
    wherein the duct is provided on its sidewall with a second opening which allows spaces inside the duct and outside the duct to communicate with each other.

2. The reservoir tank according to claim 1,
    wherein the second opening is located below the surface of the fluid in the container.

3. The reservoir tank according to claim 1,
wherein the inlet is located above the first opening, and
the duct has an inclined portion extended along an inclined direction between the inlet and the first opening.

4. The reservoir tank according to claim 3,
wherein the duct has an extended portion extended from an end of the inclined portion in a direction different from the extended direction of the inclined portion, and
the second opening is provided on a connection portion where the inclined portion and the extended portion join with each other.

5. The reservoir tank according to claim 1,
wherein the duct is provided on the first opening thereof with a deflector.

6. The reservoir tank according to claim 1,
wherein the outlet is provided on a bottom of the container below the first opening.

7. The reservoir tank according to claim 4,
wherein the extended portion is extended in a horizontal direction.

8. The reservoir tank according to claim 1,
wherein the outlet is provided on a bottom of the container, and
the first opening is set off to the side of the outlet.

9. The reservoir tank according to claim 4,
wherein the extended portion is extended downward, and
the first opening is arranged to be opposed to the outlet.

10. The reservoir tank according to claim 9,
wherein an inner diameter of the first opening is smaller than an inner diameter of the outlet.

11. The reservoir tank according to claim 9,
wherein an inner diameter of the first opening is larger than an inner diameter of the outlet.

12. The reservoir tank according to claim 1,
wherein the second opening is provided in a region of the duct under a positive pressure.

13. The reservoir tank according to claim 1,
wherein the duct has an upwardly protruding portion, and
the second opening is provided on top of the protruding portion.

14. The reservoir tank according to claim 1,
wherein a plurality of the second openings are provided on the sidewall of the duct, and
size of each of the plurality of the second openings gradually increases from the inlet to the first opening.

15. The reservoir tank according to claim 1,
wherein the container is provided with a filler port through which the fluid is poured into the container,
the duct is provided with a third opening on the sidewall thereof at a position opposite to the filler port, and
a cap of the filler port is configured to close the third opening.

16. The reservoir tank according to claim 15,
wherein the filler port is formed larger than the third opening,
the duct is provided with a first tube which is connected to the third opening and extended to the filler port, and
the cap of the filler port is configured to close an end opening of the first tube.

17. The reservoir tank according to claim 15,
wherein the duct is provided with a second tube connecting the third opening to the filler port,
the second tube is provided on a side wall thereof with a fourth opening which allows a space inside the second tube and a space outside the second tube and inside the container to communicate with each other, and
the cap of the filler port is configured to close the fourth opening.

18. A reservoir tank comprising:
a container for storing fluid therein, the container including an inlet through which the fluid flows into the container and an outlet through which the fluid flows out of the container; and
a duct provided inside the container, the duct being connected to the inlet of the container and having a first opening open inside the container,
wherein the first opening of the duct is located above the outlet of the container and below a surface of the fluid in the container,
wherein the container is provided therein with a tubular filter through which the fluid passes,
wherein the filter comprises screens provided on a lateral sidewall portion thereof and a tip end portion covering a tip end opening thereof, and
wherein the filter is configured to have its length larger than its inner diameter.

19. The reservoir tank according to claim 18,
wherein the filter is provided on the first opening of the duct.

20. The reservoir tank according to claim 18,
wherein the entire filter is installed in the fluid in the container, and
the tip end portion of the filter and the outlet of the container are located near a bottom of the container.

21. The reservoir tank according to claim 18,
wherein the container is provided with a filler port through which the fluid is poured into the container,
the filler port is provided with a cap detachable from the filler port,
the cap is provided thereon with a cap inlet through which liquid flows into the container, and
the filter is provided on the cap to remove foreign objects in the liquid flowing through the cap inlet.

* * * * *